US012605734B2

(12) United States Patent
White et al.

(10) Patent No.: US 12,605,734 B2
(45) Date of Patent: Apr. 21, 2026

(54) STRUCTURES FOR RETAINING ACCESSORY TOOLS TO A DISPENSING DEVICE

(71) Applicant: Albion Engineering Company, Moorestown, NJ (US)

(72) Inventors: Patrick Michel White, Ocean View, DE (US); Brian J. MacKenzie, Philadelphia, PA (US); Joseph B Hanni, Cherry Hill, NJ (US)

(73) Assignee: Albion Engineering Company, Morristown, NJ (US)

( * ) Notice: Subject to any disclaimer, the term of this patent is extended or adjusted under 35 U.S.C. 154(b) by 169 days.

(21) Appl. No.: 18/416,361

(22) Filed: Jan. 18, 2024

(65) Prior Publication Data

US 2025/0235890 A1 Jul. 24, 2025

(51) Int. Cl.
*B05C 17/005* (2006.01)
*B05C 17/01* (2006.01)

(52) U.S. Cl.
CPC .......... *B05C 17/0052* (2013.01); *B05C 17/01* (2013.01)

(58) Field of Classification Search
CPC ................ B05C 17/0052; B05C 17/01; B05C 17/00553; B05C 17/0126; B05B 15/60; F21L 4/005; F21V 21/0885; F21V 33/0084
See application file for complete search history.

(56) References Cited

U.S. PATENT DOCUMENTS

| | | | | |
|---|---|---|---|---|
| 3,105,614 | A | 10/1963 | Sherbondy | |
| 4,493,437 | A | 1/1985 | Breeden | |
| 4,802,607 | A | 2/1989 | Johnson | |
| 4,849,607 | A | 7/1989 | Meo | |
| 5,065,977 | A | 11/1991 | Desjardin | |
| 5,413,258 | A | 5/1995 | Kartler | |
| 6,067,683 | A | 5/2000 | Reeves | |
| 6,230,367 | B1 * | 5/2001 | Riedl | B25H 3/006 16/436 |
| 7,127,769 | B2 | 10/2006 | Chang et al. | |
| 8,308,034 | B2 | 11/2012 | Shibata et al. | |
| 8,701,237 | B2 | 4/2014 | Brosche | |
| 8,904,910 | B2 | 12/2014 | Marsden et al. | |
| 9,027,796 | B1 | 5/2015 | Leitch | |

(Continued)

*Primary Examiner* — Bob Zadeh
(74) *Attorney, Agent, or Firm* — Saxton & Stump LLC

(57) ABSTRACT

Structures for retaining one or more accessory tools to a caulking gun are disclosed. The structures are adapted to accommodate different accessory tools, such as spatulas, utility knives, hangers, handles, and flashlights. In one embodiment, the retention structure is a mounting rail affixed to the caulking gun, the mounting rail including an elongate body having a plurality of ribs oriented transverse to a major axis. In another embodiment, the retention structure is a housing affixed to the caulking gun and including a plurality of mounting rails positioned thereon. The housing may be formed of discrete components connected by a common hinge and may include an internal channel for retaining a hanger in different rotational positions. In another embodiment, a barrel strap may be used to secure multiple mounting rails to a caulking gun barrel. In another embodiment, a strap assembly is provided to enable hands-free carrying of the caulking gun.

13 Claims, 27 Drawing Sheets

(56) References Cited

U.S. PATENT DOCUMENTS

| | | | | |
|---|---|---|---|---|
| 9,039,557 | B2 * | 5/2015 | Naughton | B05C 17/0103 221/229 |
| 10,215,219 | B1 * | 2/2019 | Morley | F16B 45/06 |
| 10,286,539 | B2 | 5/2019 | Francis et al. | |
| 10,722,916 | B2 | 7/2020 | Demeris, Jr. | |
| 10,837,739 | B2 | 11/2020 | Ramirez | |
| 11,351,569 | B1 | 6/2022 | Lee et al. | |
| 11,559,879 | B2 | 1/2023 | Machida | |
| 2004/0050888 | A1 | 3/2004 | Warner | |
| 2004/0144804 | A1 | 7/2004 | Borisch | |
| 2007/0017935 | A1 * | 1/2007 | Rumrill | B05C 17/01 222/391 |
| 2009/0134191 | A1 * | 5/2009 | Phillips | B25F 5/02 362/183 |
| 2013/0134182 | A1 | 5/2013 | Brosche | |
| 2013/0160621 | A1 | 6/2013 | Marsden et al. | |
| 2015/0343617 | A1 | 12/2015 | Kondo et al. | |
| 2019/0143365 | A1 | 5/2019 | Roth | |
| 2020/0164499 | A1 | 5/2020 | Zhou et al. | |
| 2023/0184517 | A1 | 6/2023 | Davis et al. | |
| 2023/0292705 | A1 | 9/2023 | Snyder et al. | |
| 2024/0226957 | A1 * | 7/2024 | Hanni | B05C 17/01 |
| 2025/0235890 | A1 * | 7/2025 | White | B05C 17/0052 |
| 2025/0340329 | A1 * | 11/2025 | White | B65D 25/20 |

* cited by examiner

STRUCTURES FOR RETAINING ACCESSORY TOOLS TO A DISPENSING DEVICE

BACKGROUND

The invention described below relates to dispensing devices and, more particularly, to caulking guns and related accessory tools used for the application of caulk, or other viscous sealants or adhesives. Caulking guns, as they are generally known, comprise a class of construction and repair tools that expel caulk, sealant or other fill material for the purpose sealing and waterproofing joints that are likely to crack if filled with a rigid, non-flexible material. During the conventional caulking process, a bead of caulk is extruded from the caulking gun onto the desired location. Soon after the caulk has been applied, the user generally smooths and shapes the caulk with one or more accessory tools that are commonly employed during caulking. For example, a spatula is used to press the bead into the joint and to skim away the excess caulking material. Other accessory tools used during the caulking process include utility knives, caulking gun hangers (also known as ladder hooks), handles, and lights.

When caulking on either the exterior or interior of buildings, it is often difficult for an operator to retrieve these accessory tools for use such as when the operator is working on a swing stage, scaffold, or ladder, or other work structure. Oftentimes, it is difficult for the operator to simply set the caulking gun down, as there are no appropriate or suitable surfaces or locations to become "hands-free" to retrieve such accessory tools for use. Prior art attempts at addressing the foregoing issue have various drawbacks and disadvantages. Thus, there is a need to provide the ability to easily retrieve these accessory tools for use without the need to set the caulking gun down.

The present invention is directed to caulking guns equipped with structures for retaining such accessory tools thereto enabling easy retrieval of the accessory tools during application of caulk and other viscous materials. The retention structures allow for such retrieval of accessory tools without the need to set the caulking gun down. The present invention is also directed to a strap assembly for wearing around an operator's neck to enable hands-free carrying of the caulking gun, or tying off of the caulking gun to a work structure.

SUMMARY

Structures for retaining one or more accessory tools to a dispensing device are disclosed. The retention structures are adapted to accommodate a multitude of different accessory tools, such as spatulas, utility knives, caulking gun hangers, handles, and lights. In one embodiment, the retention structure may include a mounting rail arranged to be affixed to the dispensing device and may include an elongate body and a plurality of ribs oriented transverse to a major axis of the mounting rail.

In another embodiment, the retention structure may be a housing arranged for engagement with the dispensing device. The housing may include a plurality of mounting rails positioned thereon, each mounting rail arranged for removable attachment of one or more accessory tools thereto. The housing may be formed of discrete components connected by a common hinge and arranged to move from an open position to a closed position to engage the dispensing device. The housing components may be complementary to each other. Each mounting rail may include an elongate body having a major axis and a plurality of ribs and grooves oriented transverse to the major axis.

In another embodiment, the housing may include an internal channel to permit a caulking gun hanger inserted therein to be adjusted to several different rotational positions with respect to the dispensing device to reduce or eliminate swinging of the dispensing device while hanging from a work fixture such as a ladder during use.

In another embodiment, the retention structure may include a plurality of mounting rails positioned about a cylindrical barrel of a dispensing device and secured to the barrel using a barrel strap arranged to pass through a slot located in each of the mounting rails.

In another embodiment, a strap assembly is provided for wearing around an operator's neck to enable carrying the dispensing device without requiring the operator's hands and in a manner that retains the dispensing device close to the operator's body regardless of whether the operator is right-handed or left-handed.

BRIEF DESCRIPTION OF THE DRAWINGS

The invention will be described in conjunction with the following drawings in which like reference numerals designate like elements and wherein.

DETAILED DESCRIPTION

Figure 1:
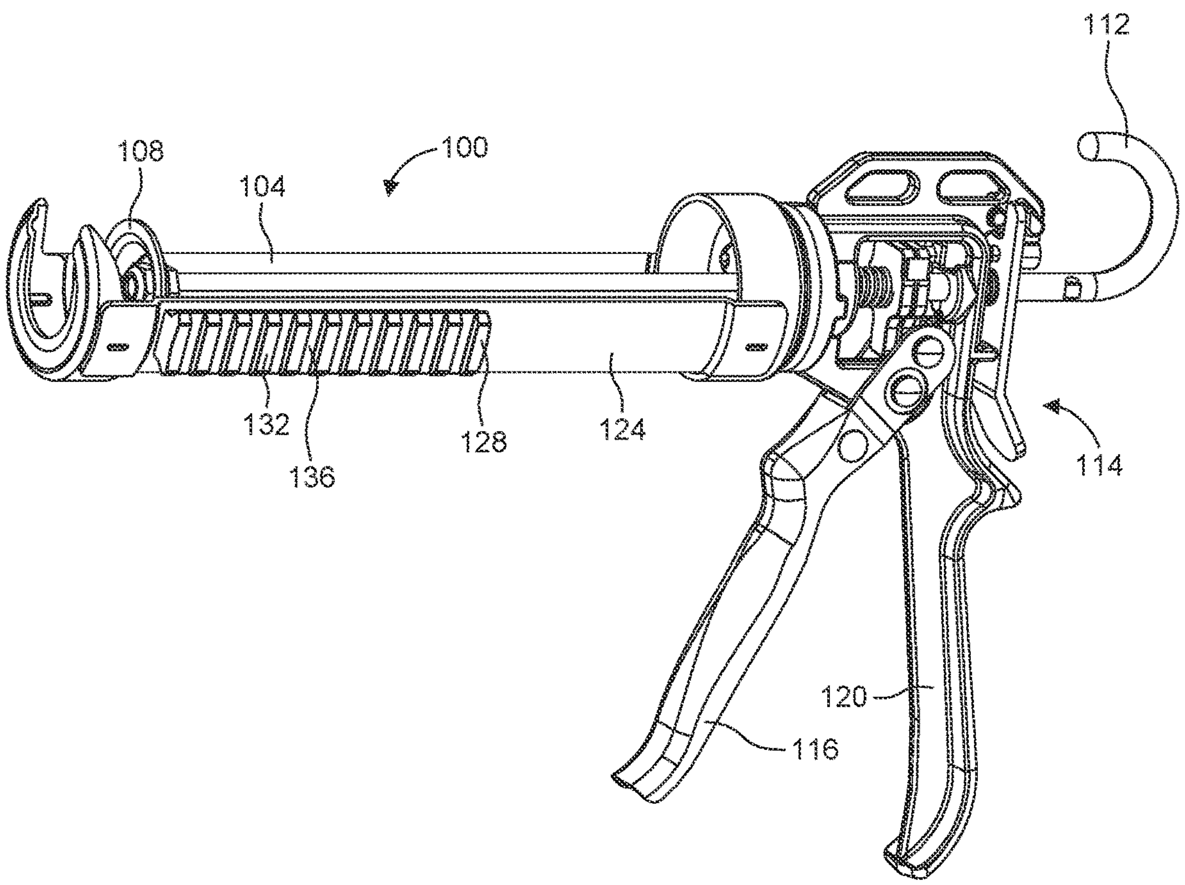
FIG. 1 is a perspective view of cartridge-type dispensing device shown with an inventive mounting rail affixed to the carriage assembly according to the present disclosure.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections. These elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The term "integral" or "integrally formed," when used herein with reference to at least to elements, refers to two elements that respectively define a portion, part, or piece of one and the same object, and/or two objects that are permanently coupled to one another such that the objects cannot be separated from one another without destructive means. The term "integral" includes a portion, part, or piece of an element that cannot be separated from the whole of the element without destructive means. For example, the term "integral" may refer to objects that are welded together, objects that are formed or cast as a single unit, as well as portions, parts, or pieces of a single, monolithic object.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

In each of the subsequent embodiments disclosed herein, some elements shared with the first embodiment (caulking gun 100) are represented by reference numerals increased by factors of 100. For example, trigger assembly 114 shown in FIGS. 1 and 2 corresponds to trigger assembly 214 shown in FIGS. 3-5. In the interest of balancing clarity and brevity, some features of subsequent embodiments that are shared with the first embodiment are numbered in the figures but are not separately called out in the specification.

Figure 2:
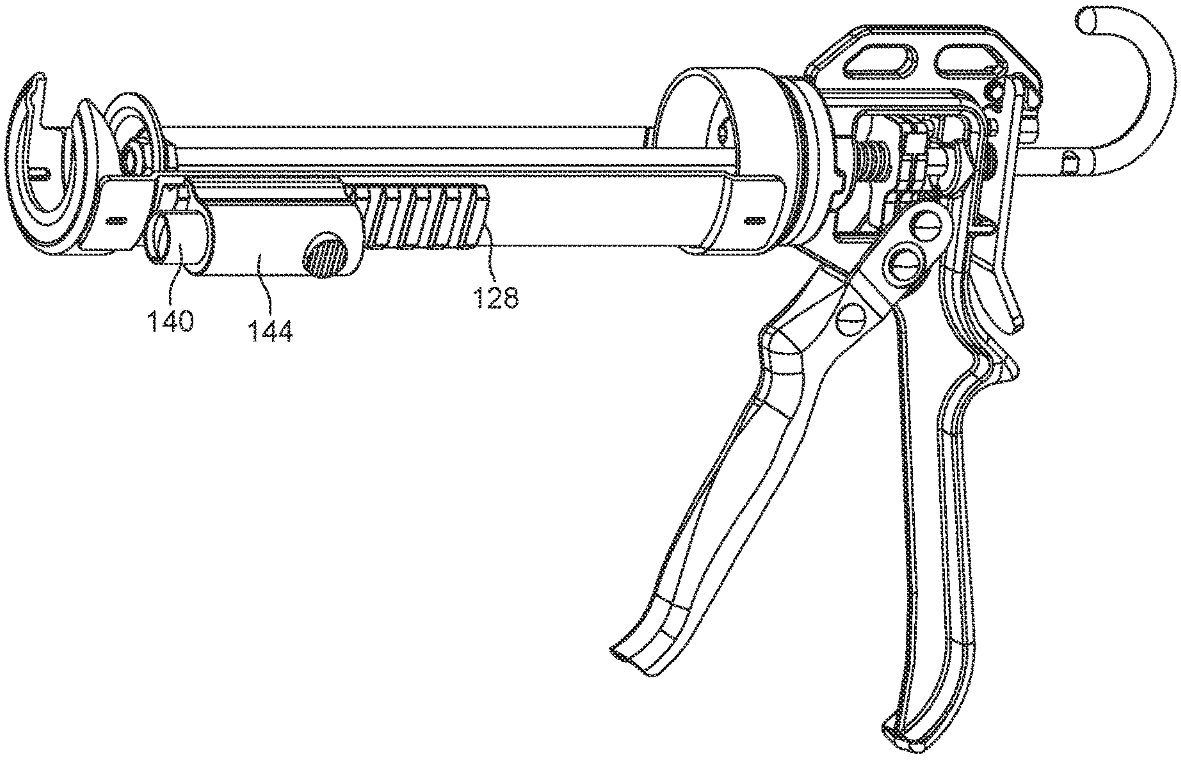
FIG. 2 is a perspective view of the dispensing device of FIG. 1 with a flashlight mounted to the inventive mounting rail.

Referring now to the drawings, and particularly FIGS. 1-2, there is shown generally a dispensing device in the form of a caulking gun 100 incorporating the features of the invention. The caulking gun 100 includes a piston rod 104 which comprises a threaded end to which a piston 108 is attached, and a return hook 112. The piston rod 108 is adapted to be disposed in sliding relation within a trigger assembly 114. The trigger assembly 114 includes an operating trigger 116 and an associated handle grip 120. The trigger 116 is pivotally mounted to the trigger assembly 112 by a pin. In known ways, pivotal motion of the trigger 116 is translated into linear motion of the piston rod 104 and piston 108. Hence, actuation of the trigger 116 moves the piston rod 104 and piston 108 in an axial direction. The caulking gun 100 includes a forward section in the form of a carriage assembly 124 of conventional design for housing a cartridge (not shown) containing a viscous material to be dispensed such as caulks or sealants. The cartridge is of standard size and configuration and comprises a tubular cylindrical body portion containing the material to be dispensed, a movable plunger at the rearward end of the body portion, and a dispensing nozzle located at the forward end of the cartridge. The moveable piston rod 104 and piston 108 provides means for the dispensing device 100 to apply dispensing pressure to the material housed within the cartridge. When the cartridge is appropriately registered within the carriage assembly 124, and the trigger 116 actuated, the piston rod 104 and piston 108 apply a force moving the cartridge plunger in a forward ejecting direction towards the cartridge nozzle to expel material from the cartridge. The trigger 116 is caused to return to its original position for a repeat of the action detailed above.

As best seen in FIG. 1, a mounting rail 128 is shown affixed to the carriage assembly 124 by any suitable means, e.g., screws, rivets, or other suitable fasteners. The mounting rail 128 may allow a variety of accessory tools to be attached to the dispensing device 100. Such accessory tools may include lights, spatulas, utility knives, mounting interfaces, hangers, ladder hooks, handles, etc. The mounting rail 128 includes an elongate body such as in the form of a rectangular strip that may be affixed to the carriage assembly 124 in any orientation, e.g., a horizontal orientation.

The mounting rail 128 includes a series of generally rectangular-shaped ridges 132 that are formed perpendicular or transverse to the long axis of the mounting rail 128. The ridges 132 may be uniformly spaced from one another and may be of uniform height. The ridges 132 may be separated by respective slots 136. In a common configuration of the mounting rail 128, the ridges 132 have a height of approximately 3 mm, and a spacing between adjacent ridges or slots 136 of approximately 10 mm. In general, an accessory tool is mounted at or within the slot 136.

Figure 11:
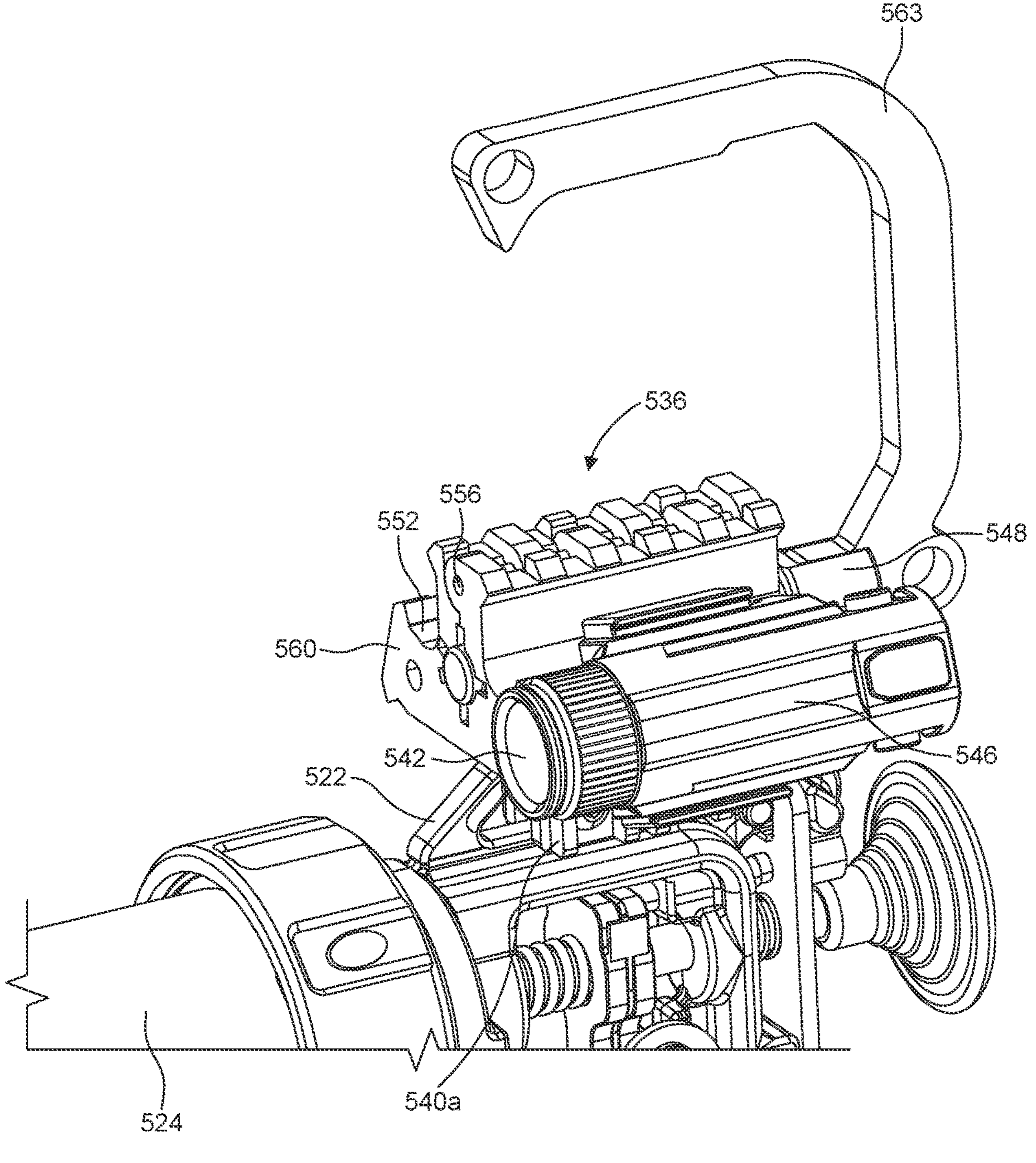
FIG. 11 is an enlarged perspective view of a portion of the dispensing device of FIG. 10.

In FIG. 2, a flashlight 140 or light is shown disposed within an accessory tool housing 144 that is fitted over and secured to the mounting rail 128. In FIG. 6A, a sectional view illustrates the manner for securing the accessory tool housing 144 to the mounting rail 128. Under this embodiment, the mounting rail 128 includes angled sidewalls 128*b* and 128*c* that extend upwardly from a pedestal 128*d* to a top surface 128*a*. Together, the angled sidewalls 128*b* and 128*c* form a male dovetail profile. The accessory tool housing 144 is dimensioned to complement the male dovetail profile of the mounting rail 128. In one embodiment, the accessory tool housing 144 is provided with a female dovetail profile including inward extending ears that are complementary of the male dovetail profile of the mounting rail 128. Under this embodiment, the accessory tool housing 144 is arranged to be snap-fitted or pinch-fitted over the mounting rail 128 and be fixed in place on the rail using suitable hardware, e.g., a screw. In another embodiment, the accessory tool housing 144 having the female dovetail profile could be slid over the angled sidewalls 128*b* and 128*c* of the mounting rail 128 and clamped thereto using suitable hardware, e.g., a screw. In yet another embodiment (shown in FIG. 11C), the accessory tool housing 546 may comprise two parts of a whole and include a female dovetail profile. The accessory tool housing 546 could be fitted over the male dovetail profile of the mounting rail 564, and the housing parts tightened together and clamped to the mounting rail 564 using suitable fastening hardware, e.g., screw and bolt 576. The accessory tool housing 546 may be affixed to the mounting rail 564 in other known ways. For example, in another embodiment, one of the inward extending dovetail ears may be fixed and the other may be pivotable to enable the housing 546 to be fitted over the angled sidewalls of the mounting rail 564. The accessory tool housing 144, 546 includes an internal bore sized to receive the flashlight 140 therein and may include an opening on its outside surface for an on/off switch to extend through. The mounting rail 128 may be a standard rail such as a Picatinny rail, or a Weaver rail. Any type of rail, including a rail with a square or angled dovetail profile, may be used.

Figure 3:
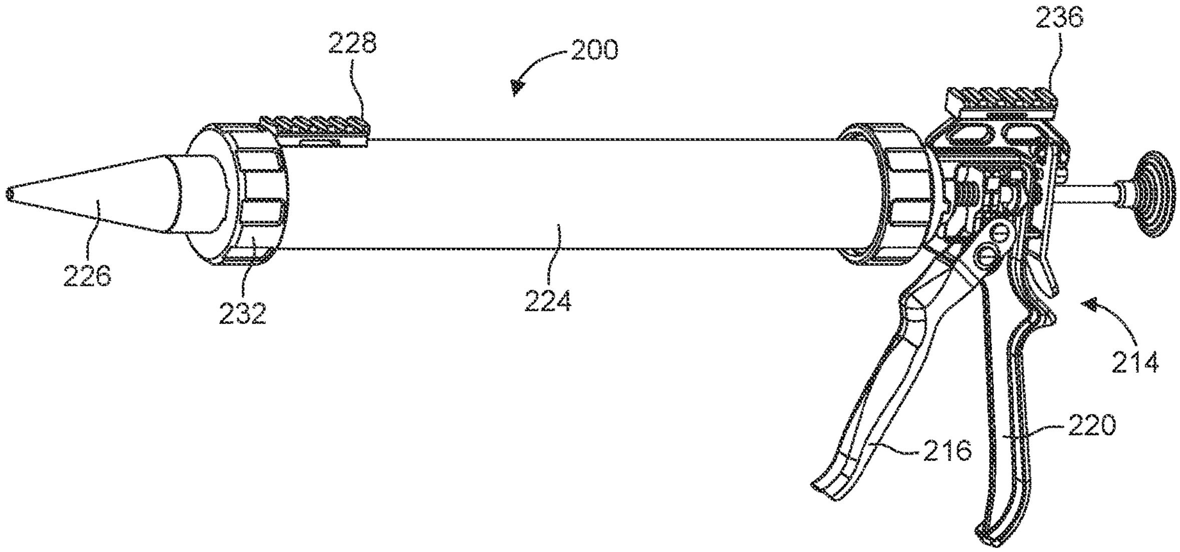
FIG. 3 is a perspective view of a dispensing device having a barrel for dispensing a viscous material in bulk form or from a sausage with a mounting rail integral with the front cap and another mounting rail affixed to a frame portion of the dispensing device.
Figure 4:
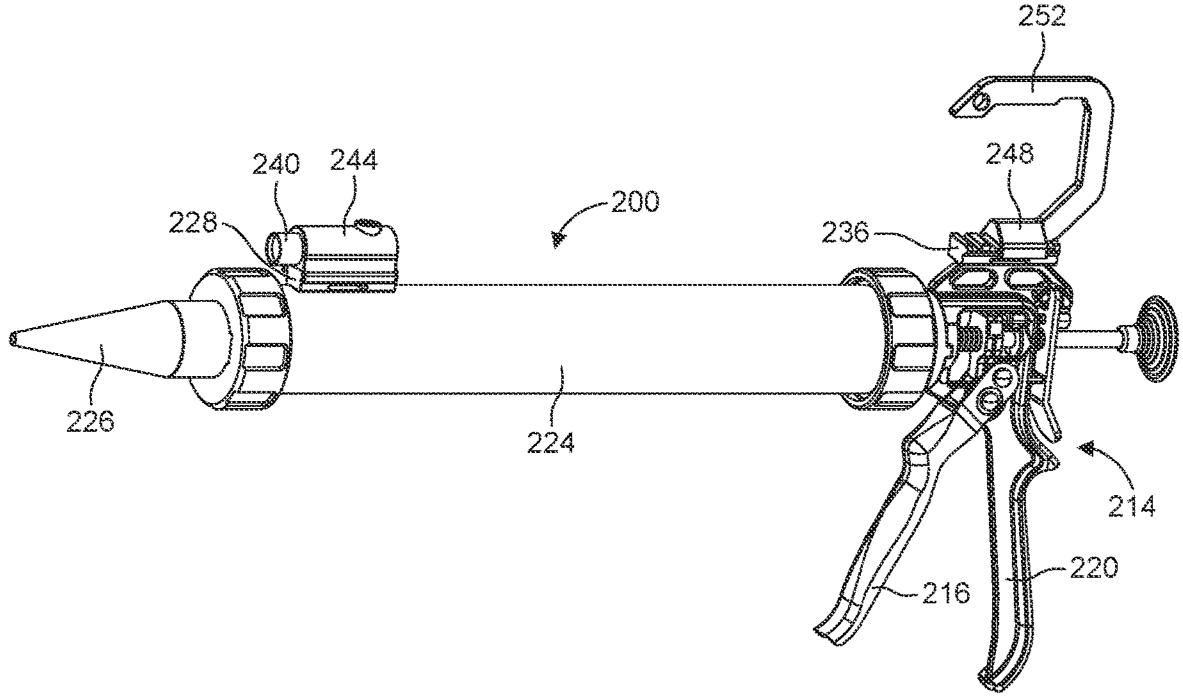
FIG. 4 is a perspective view of the dispensing device of FIG. 3 with accessory tools, i.e., a flashlight and a ladder hook, mounted to mounting rails affixed to the barrel and frame portion of the dispensing device.
Figure 5:
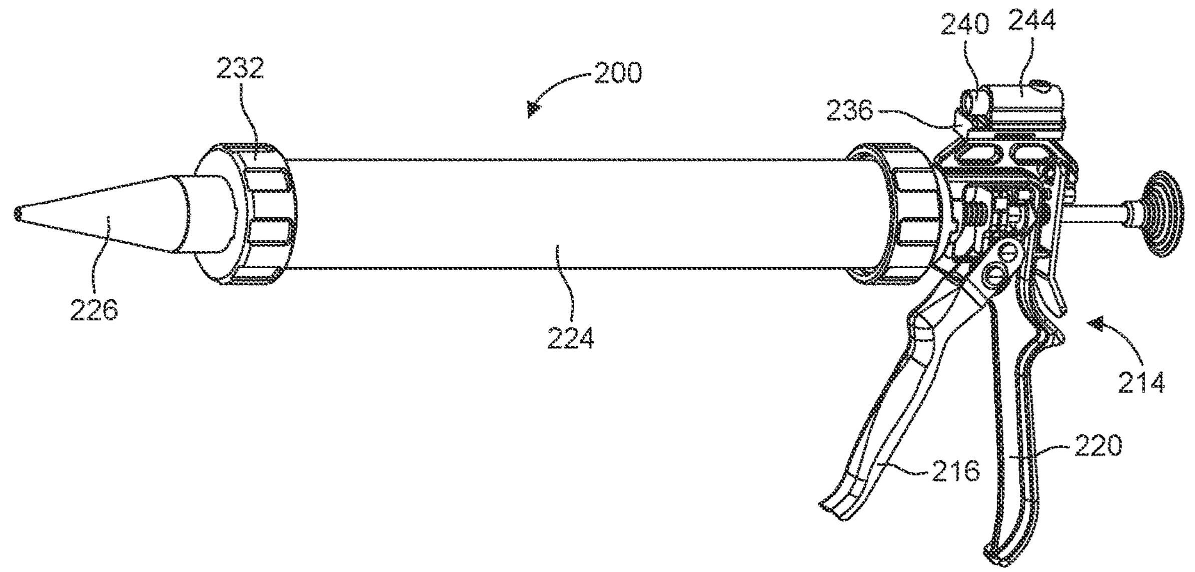
FIG. 5 is a perspective view of the dispensing device of FIG. 3 with an accessory tool, i.e., a flashlight, mounted to a mounting rail affixed to a frame portion of the dispensing device.

Referring now to FIGS. 3-5, there is shown generally a dispensing device in the form of a caulking gun 200 incorporating the features of the invention. The caulking gun 200 operates in a manner similar to that described above and instead includes a cylindrical barrel 224 for containing a viscous material in bulk form or within a sausage package. A trigger assembly 214 includes a pivotally mounted trigger 216 and an associated handle grip 220. As described above, actuation of the trigger 216 applies dispensing pressure to the material housed within the barrel 224 in a forward ejecting direction towards a nozzle 226 to expel material from the barrel 224. The nozzle 226 is retained on the barrel 224 utilizing a front cap 232.

In FIG. 3, a front mounting rail 228 is shown as being integral with and a part of the front cap 232. The front mounting rail 228 extends from the front cap 232 rearwardly towards the trigger assembly 214. A rear mounting rail 236 is affixed to a frame portion located above the trigger assembly 214. The front and rear mounting rails 228, 236 may be positioned at other suitable locations on the caulking gun 200 depending upon operator preference. The front and rear mounting rails 228, 236 are sized and dimensioned to include a series of transversely oriented ridges uniformly separated by respective slots similar to the mounting rail 128 and may be affixed to the caulking gun 200 by any suitable means, e.g., screws, rivets, or other suitable fasteners. The front and rear mounting rails 228, 236 are suited for mounting various different accessory tools thereon. For example, the front mounting rail 228 is utilized for mounting a flashlight 240 thereon using an accessory tool housing 244 dimensioned to be fitted over the mounting rail 228 as discussed above. FIG. 5 demonstrates that the flashlight 240 could also be mounted to the rear mounting rail 236 in a similar manner. In FIG. 4, the rear mounting rail 236 could be utilized for mounting a different accessory tool, e.g., a caulking gun hanger 252, which is affixed to the mounting rail 236 using a suitable accessory mount 248 fitted thereover, as discussed above. Alternatively, the caulking gun hanger 252 could be mounted to the front mounting rail 228.

Figure 6:
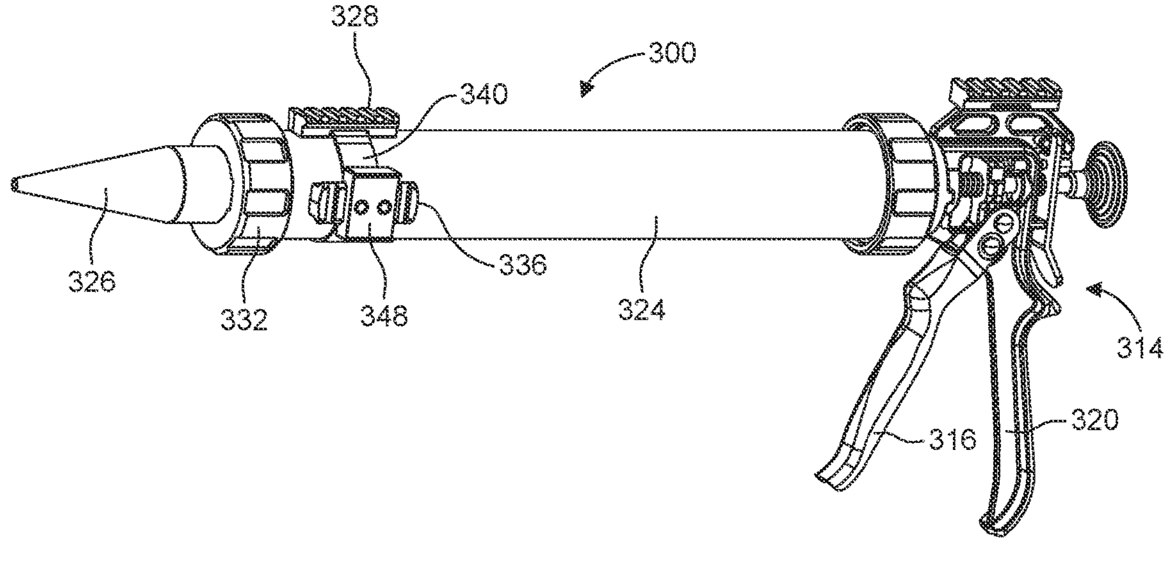
FIG. 6 is a perspective view of the dispensing device of FIG. 3 with inventive mounting rails secured on the barrel using an inventive barrel strap.
Figure 6A:
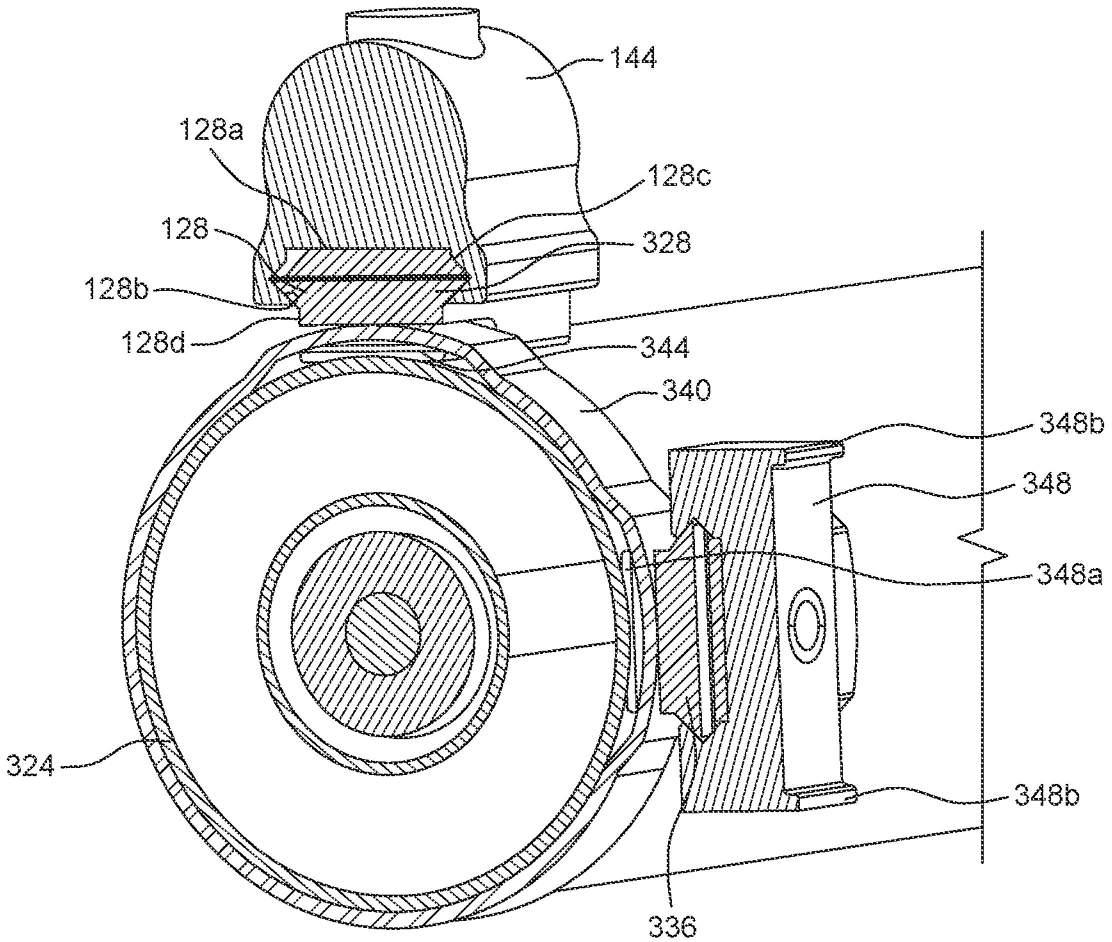
FIG. 6A is an enlarged sectional view illustrating how the barrel strap secures the mounting rails to the barrel of the dispensing device.
Figure 7:
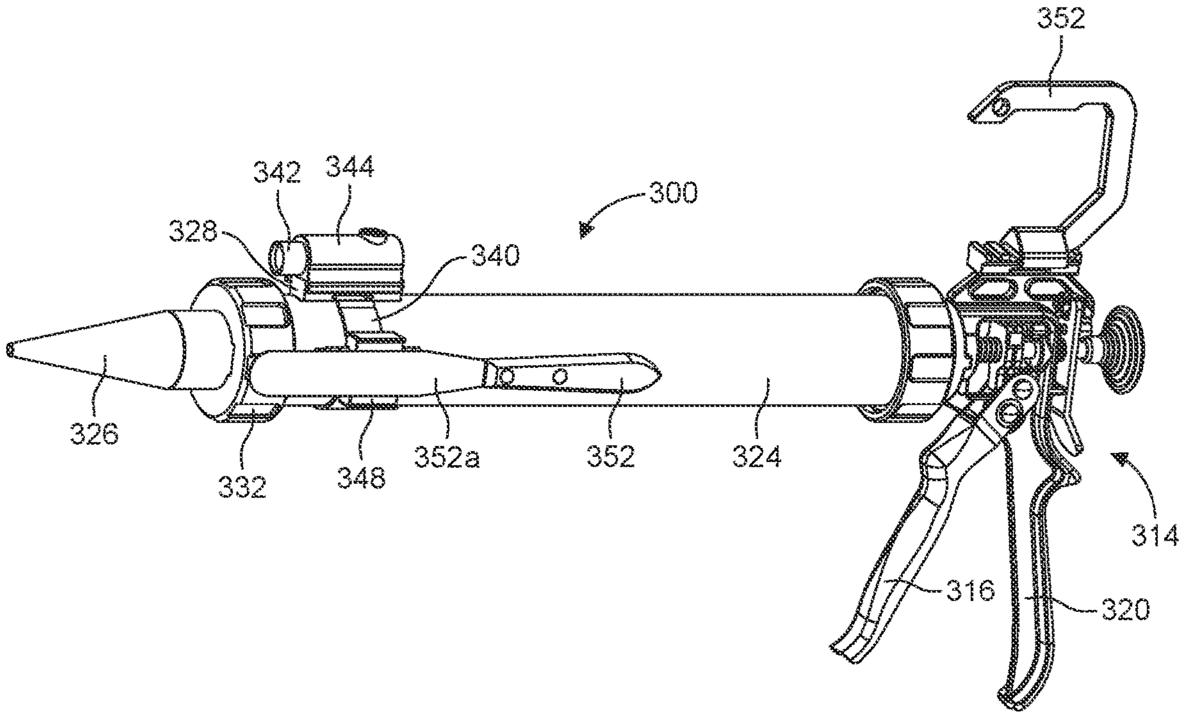
FIG. 7 is a perspective view of the dispensing device of FIG. 6 with various accessory tools mounted to the mounting rails.

Referring now to FIGS. 6 and 7, there is shown generally a dispensing device in the form of a caulking gun 300 incorporating features of the invention. The caulking gun 300 includes a cylindrical barrel 324 for containing a viscous material in bulk form or within a sausage package. The caulking gun 300 dispenses the viscous material from the cylindrical barrel 324 in known ways as described above.

A plurality of mounting rails 328 and 336 are shown positioned radially about the outside surface of the cylindrical barrel 324 in proximity to the dispensing end of the barrel 324. The mounting rails 328 and 336 are configured to include a series of transversely oriented ridges uniformly separated by respective slots as described above. The mounting rails 328 and 336 are secured to the cylindrical barrel 324 utilizing a barrel strap 340. As best shown in FIG. 6A, each of the mounting rails 328 and 336 is provided with a through slot 344, 348*a*, respectively, located below the pedestal 128*d*. The through slots 344, 348*a* are dimensioned for receiving the barrel strap 340 therethrough to secure the mounting rails 328 and 336 to the cylindrical barrel 324. The barrel strap 340 is dimensioned to encircle and frictionally engage the cylindrical barrel 324. It should be understood that a greater or fewer number of mounting rails could be secured to the cylindrical barrel 324 utilizing the barrel strap 340, and multiple barrel straps may be employed over the length of the barrel 324. For example, as illustrated in FIG. 6, four mounting rails could be secured to the barrel 324 utilizing the barrel strap 340 with one mounted at a 12 o'clock position, a second mounted at a 3 o'clock position, a third mounted at a 6 o'clock position, and a fourth mounted at a 9 o'clock position. A greater or fewer number of mounting rails could be secured to the cylindrical barrel 324 at the same or at different positions utilizing the barrel strap 340 based upon operator preference.

The barrel strap 340 may be comprised of any suitable elastic material, flexible material, or semi-rigid material. The barrel strap 340 may be any suitable thickness ranging from about 0.5 mm to between 1.5 and 2 mm and any suitable width ranging from about 20 mm to 60 mm. The barrel strap 340 may be a continuous loop sized to frictionally engage the cylindrical barrel 324 or may be a suitable length having two ends arranged to wrap over the cylindrical barrel 324. The barrel strap 340 may be utilized to position the mounting rails anywhere along the length of the cylindrical barrel 324 based upon operator preference. As shown in FIGS. 6 and 7, the mounting rails are positioned in proximity to the distal end of the cylindrical barrel 324. Alternatively, the mounting rails could be positioned in proximity to the proximal end of the barrel 324 or anywhere over the length of the barrel.

As discussed above, the mounting rails are suited for mounting various different accessory tools thereon. As shown in FIG. 7, the mounting rail 328 is utilized for mounting a flashlight 342 thereon using an accessory tool housing 344 dimensioned to be fitted over the mounting rail 328 in the manner described above. As shown in FIGS. 6, 6A, and 7, the mounting rail 336 is utilized for mounting a retention interface 348 thereon for retaining an accessory tool such as a putty knife 352 having a flat blade 352*a*. The retention interface 348 may include magnets on its face for retaining the flat blade 352*a* of the putty knife 352 therein, and may include upstanding shoulders 348*b*, also for accessory tool retention purposes. The retention interface 348 may include a female dovetail profile dimensioned to snap fit over the male dovetail profile of the mounting rail 336 for securement thereto as described above.

Figure 8:
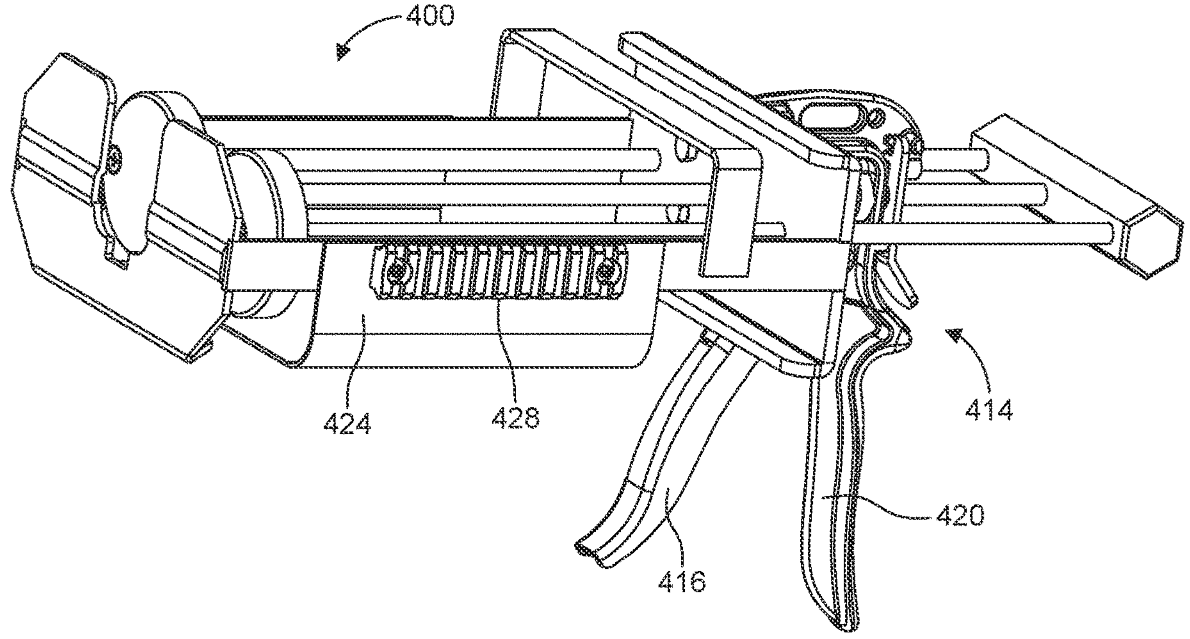
FIG. 8 is a perspective view of a multi-component dispensing device with an inventive mounting rail affixed to the carriage assembly of the dispensing device.
Figure 9:
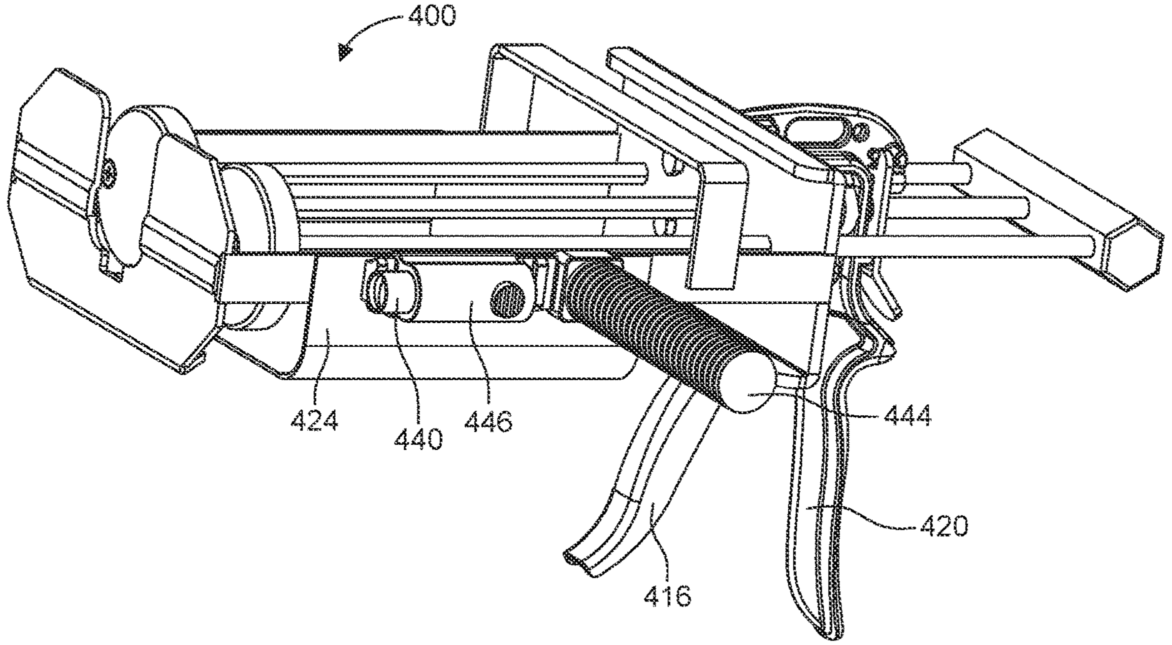
FIG. 9 is a perspective view of the multi-component dispensing device of FIG. 8 with multiple accessory tools, i.e., a light and a handle, mounted to a single mounting rail.
Figure 10:
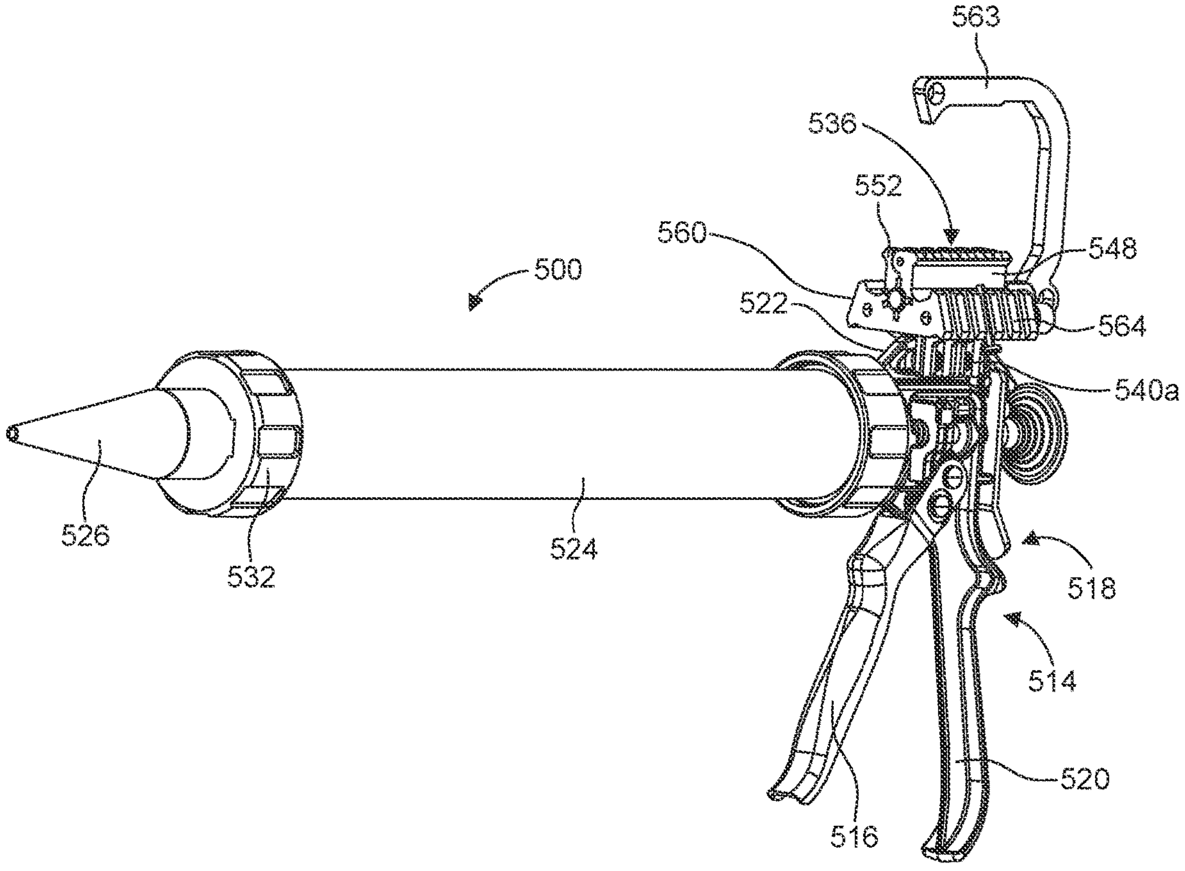
FIG. 10 is a perspective view of the dispensing device of FIG. 3 with an inventive structure for retaining accessory tools affixed to a frame portion of a dispensing device, the retention structure shown retaining a caulking gun hanger therein.

Referring now to FIGS. 8 and 9, there is shown generally a dispensing device in the form of a multi-component dispensing device 400 for dispensing viscous materials from multiple cartridges (not shown) to be loaded within a carriage assembly 424. The dispensing device 400 dispenses the viscous material from the cartridges in known ways similar to that described above. A mounting rail 428 is shown affixed to the carriage assembly 424 and is configured to include a series of transversely oriented ridges uniformly separated by respective slots similar to the mounting rail 128 described above. The mounting rail 428 is shown affixed to the carriage assembly 424 by any suitable means, e.g., screws, rivets, or other suitable fasteners. As shown in FIG. 9, multiple accessory tools may be attached to a single mounting rail 428. For example, a handle 444 and a flashlight 440 may be attached to the mounting rail 428, as described above.

Figure 13:
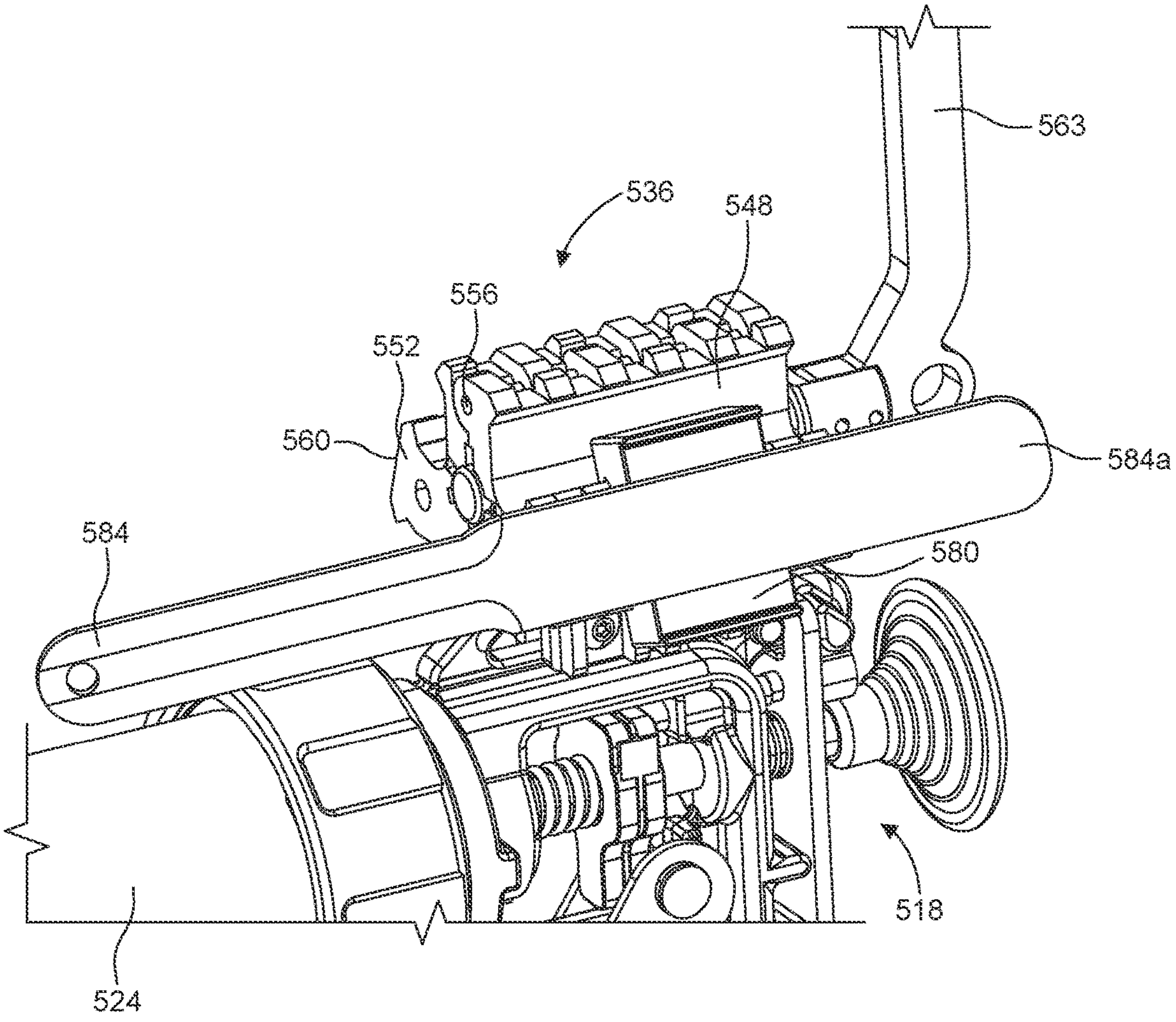
FIG. 13 is an enlarged perspective view of a portion of the dispensing device of FIG. 10 illustrating the retention structure with an exemplary accessory tool, i.e., a spatula, mounted thereon.
Figure 14:
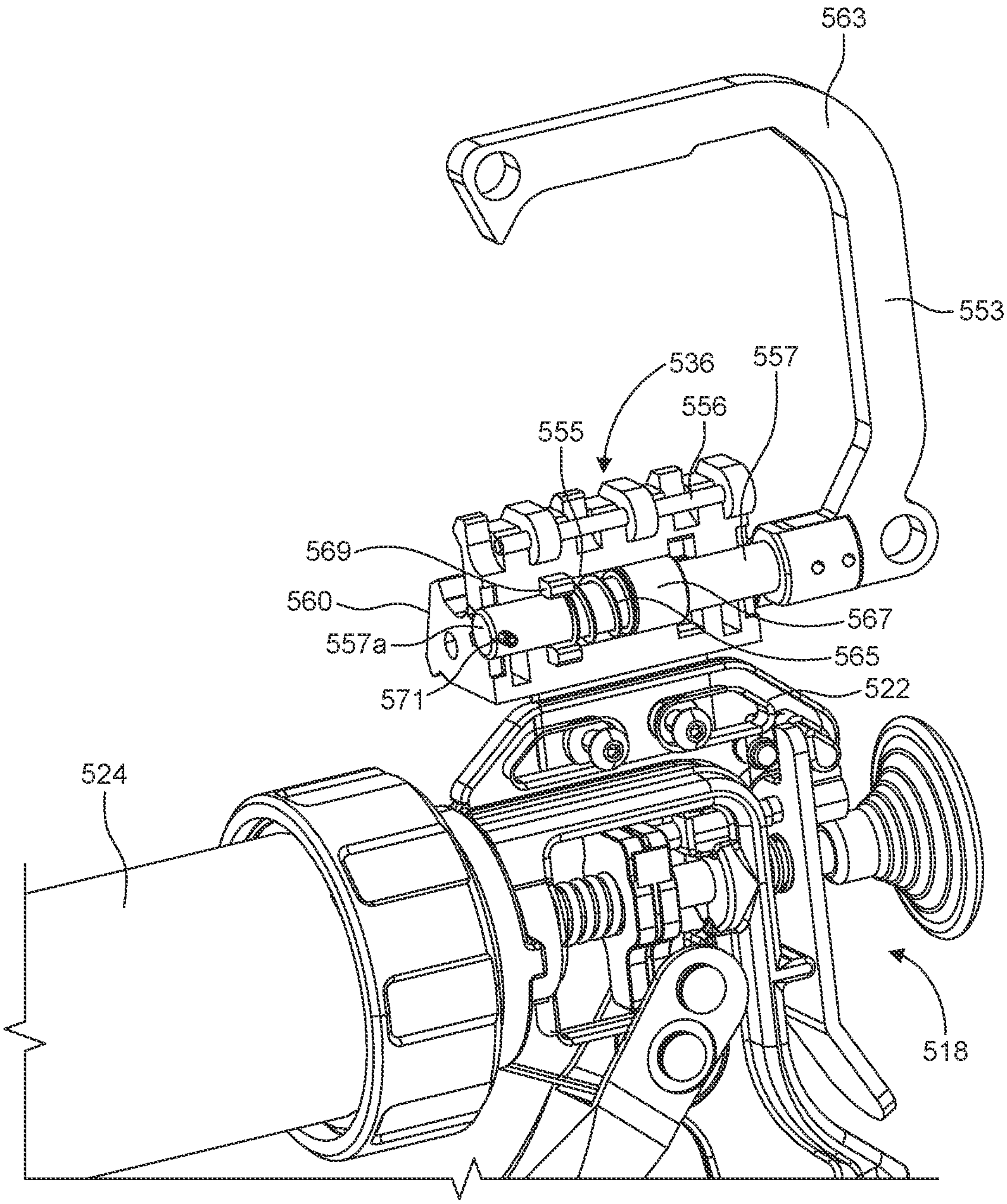
FIG. 14 is an enlarged perspective view of a portion of the dispensing device of FIG. 10 with a portion of the housing removed from the retention structure to illustrate internal details.
Figure 15:
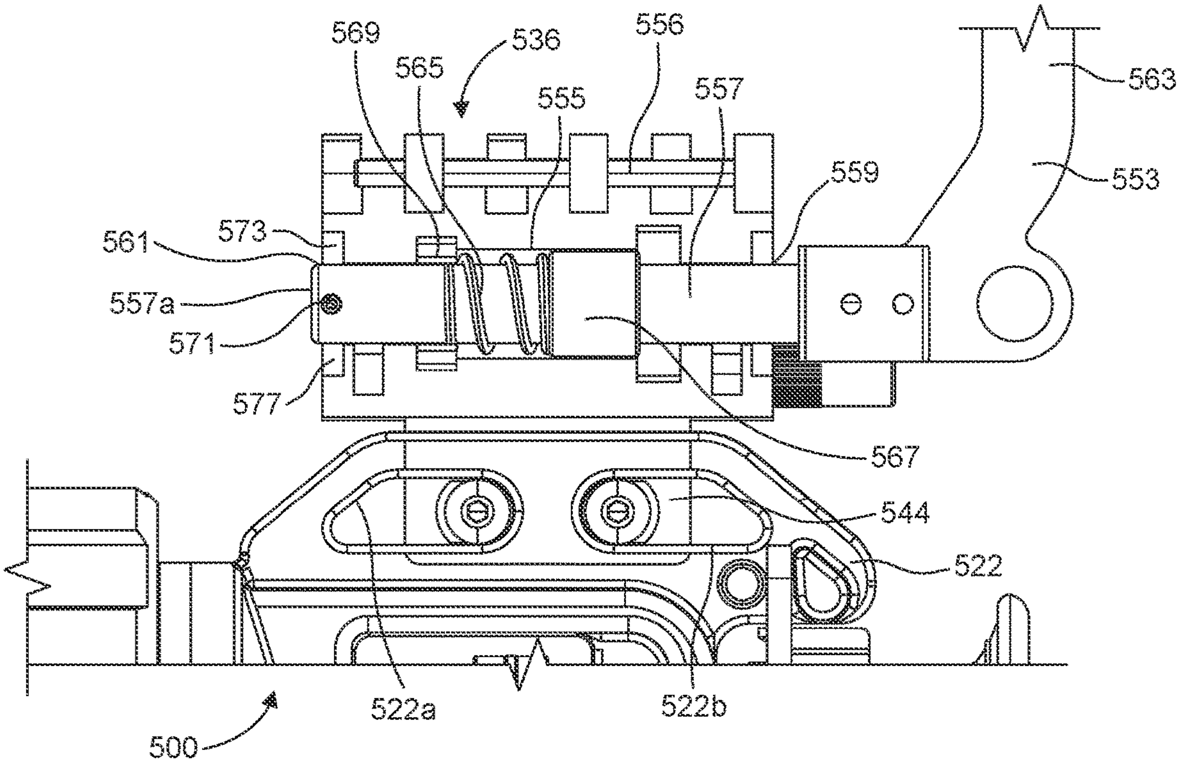
FIG. 15 is an enlarged side elevational view of a portion of the dispensing device of FIG. 10 with a portion of the housing removed from the retention structure to illustrate internal details.
Figure 15A:
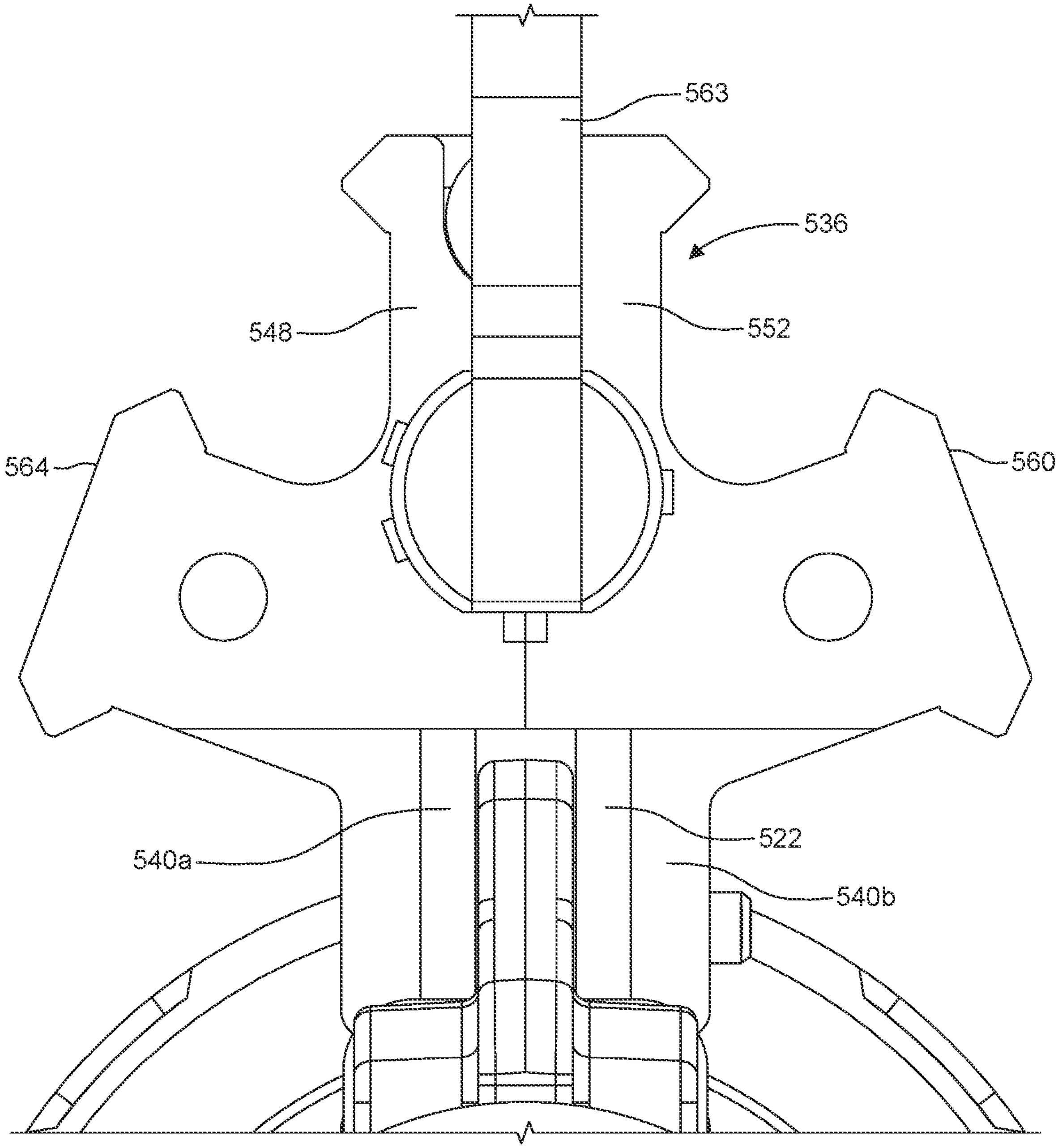
FIG. 15A is an enlarged rear elevational view of the retention structure affixed to the dispensing device of FIG. 10 and showing a portion of the caulking gun hanger retained therein in the upright deployed orientation.

Referring now to FIGS. 10 through 19, there is shown generally a dispensing device in the form of a caulking gun 500 incorporating features of the invention. The caulking gun 500 includes forward section in the form of a cylindrical barrel 524 for containing a viscous material in bulk form or within a sausage package, and a drive assembly 518 joined to the barrel 524. The drive assembly 518 includes a trigger assembly 514 formed of a pivotally mounted trigger 516 and an associated handle grip 520. The drive assembly 518 includes a frame portion 522 that extends upwardly from the trigger assembly 514. As best shown in FIG. 15, the frame portion 522 includes slot-type openings 522*a* and 522*b*. As described above, actuation of the trigger 516 applies dispensing pressure to the material housed within the barrel 524 in a forward ejecting direction towards a nozzle 526 to expel material from the barrel 524. The nozzle 526 is retained on the barrel 524 utilizing a front cap 532. Alternatively, the forward section of the caulking gun 500 could be in the form of a carriage assembly of conventional design for housing a cartridge containing a viscous material to be dispensed such as caulks or sealants.

In FIGS. 10-19, a retention structure 536 is shown affixed to the frame portion 522 of the trigger assembly 514. The retention structure 536 includes a first housing component 548 and a second housing component 552. The second housing component 552 is joined to the first housing component 548 by a hinge rod 556 attached to and extending between the housing components 548, 552 to form a clamshell device that can be moved between open and closed positions. Referring now to FIGS. 11A-11C and 15, the retention structure 536 is shown in the closed position and includes a pair of clamping plates 540*a* and 540*b* that extend in a downward direction. When the retention structure 536 is in the closed position, the clamping plates 540*a* and 540*b* are situated generally parallel to one another and separated from one another by a predetermined distance to define a space therebetween, the space being sized to receive the frame portion 522 of the trigger assembly 514 therein. In this manner, the retention structure 536 may be affixed to the frame portion 522 using any suitable hardware 544, e.g., screws, rivets, or other fasteners, the hardware 544 sized to pass through openings in the clamping plates 540*a* and 540*b*, and through the slot-type openings 522*a* and 522*b* of the frame portion 522.

The retention structure 536 may be formed of any suitable impact-resistant material such as an injection molded plastic material. A plurality of mounting rails 560 and 564 are shown disposed on the retention structure 536. The mounting rails 560 and 564 may be formed integral with or mechanically fastened, welded, brazed, adhered and/or otherwise attached to the retention structure 536. According to one embodiment of the disclosure, two mounting rails 560 and 564 extend angularly at 10 o'clock and 2 o'clock positions. In other embodiments, the mounting rails could be greater or fewer in number and could extend from different angular positions on the retention structure 536. As in earlier embodiments, the mounting rails 560 and 564 allow a variety of accessory tools to be attached to the caulking gun 500.

Figure 11A:
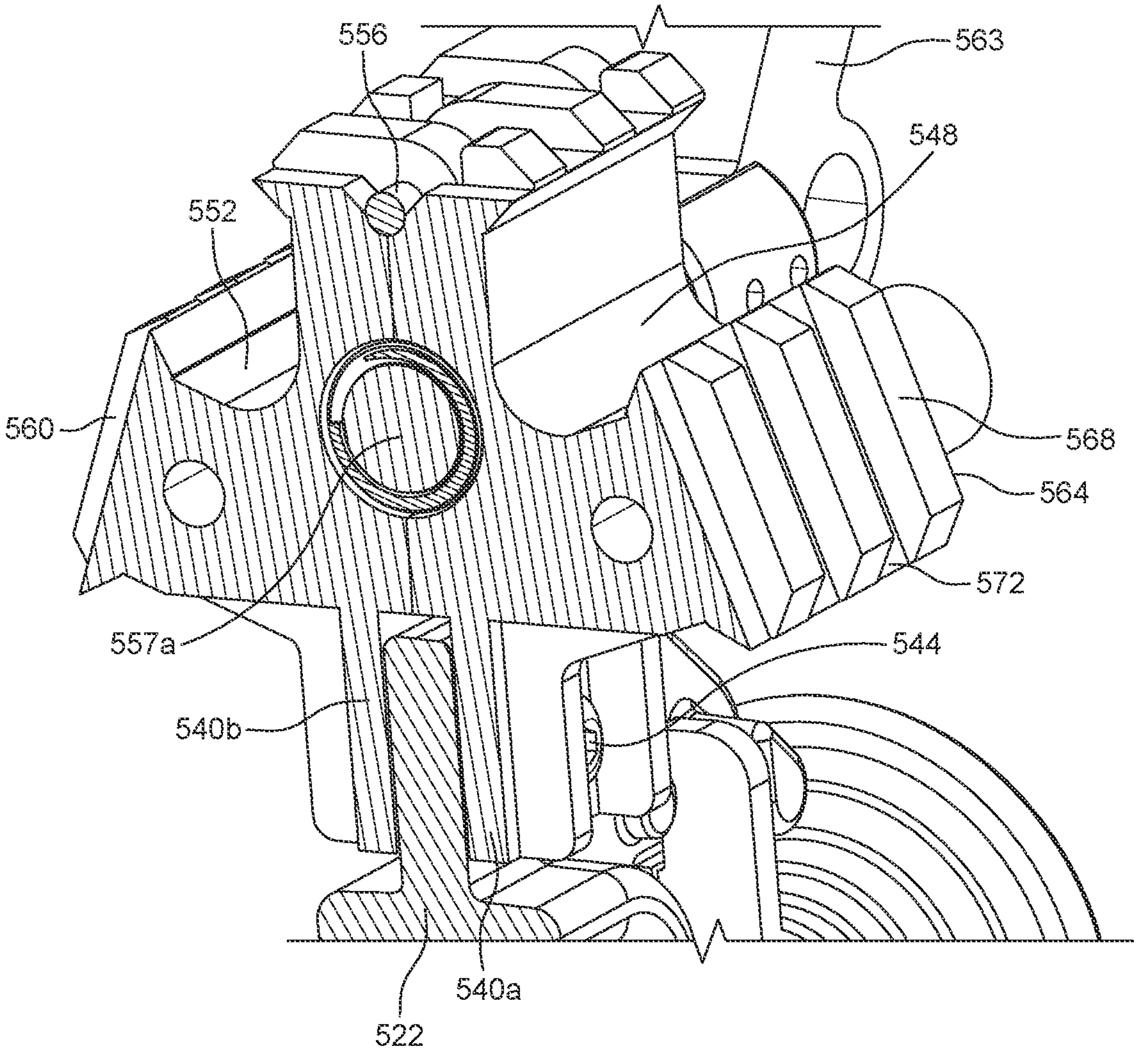
FIG. 11A is an enlarged sectional view illustrating details of the retention structure of FIG. 10.
Figure 11B:
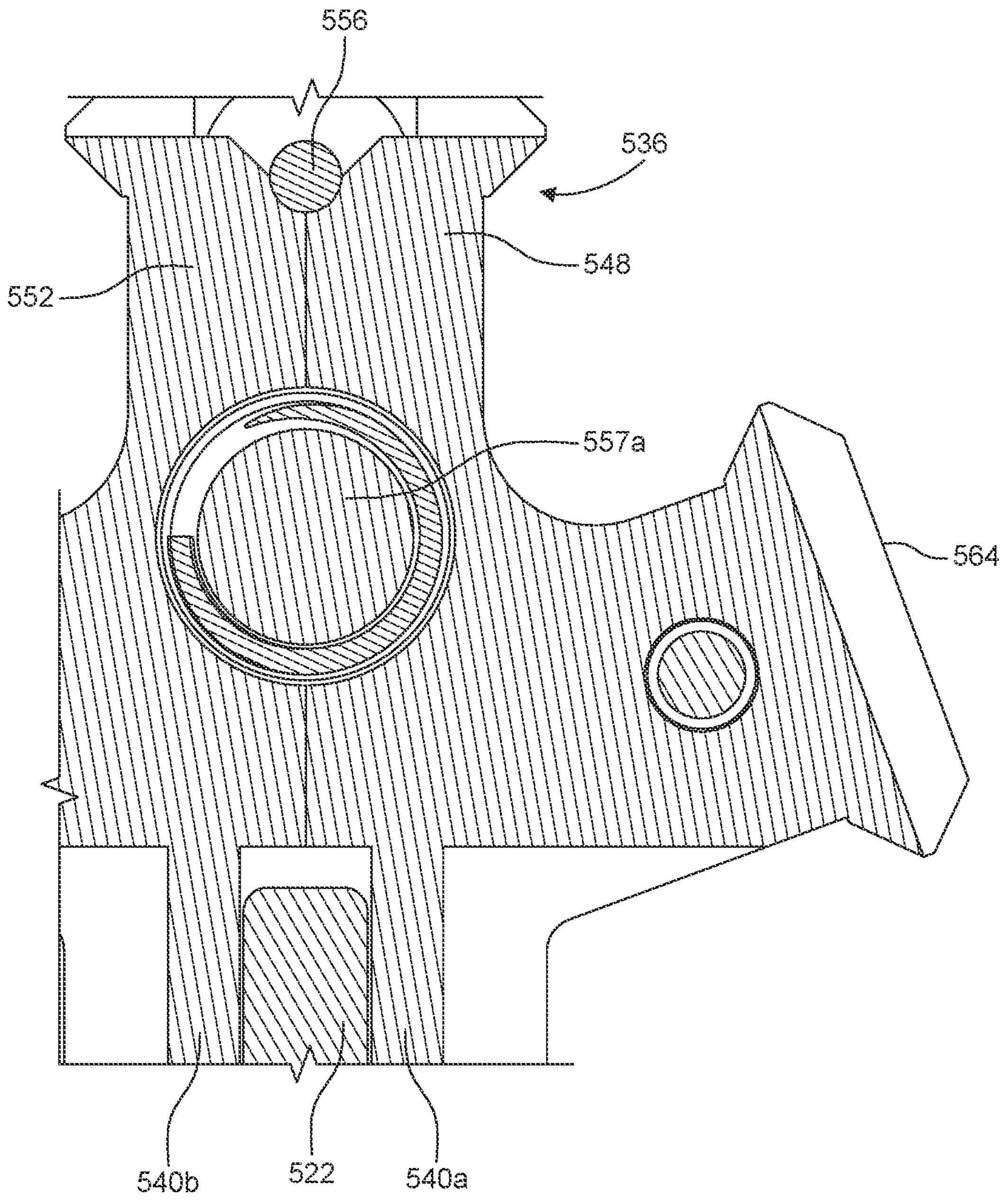
FIG. 11B is an enlarged sectional view illustrating details of the retention structure of FIG. 10.
Figure 11C:
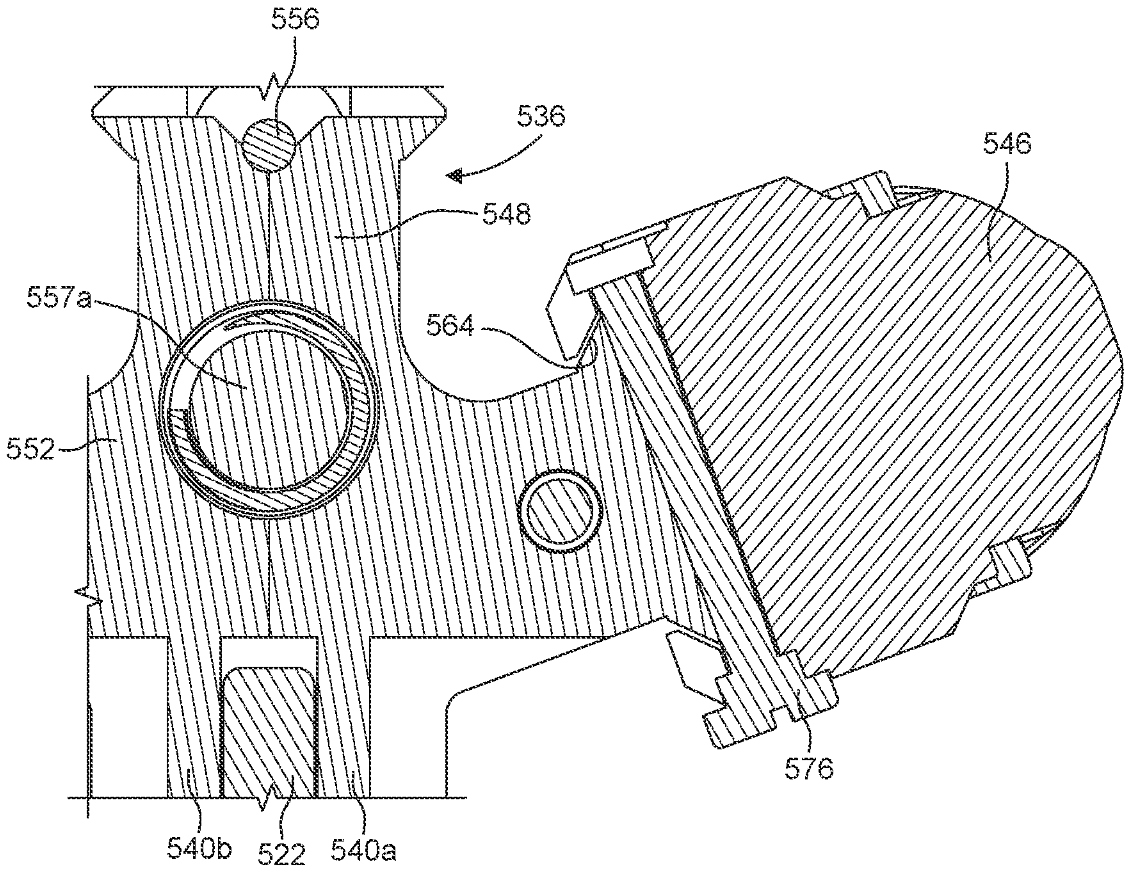
FIG. 11C is an enlarged sectional view of a portion of the retention structure of FIG. 10 illustrating the manner for mounting an accessory tool housing thereon.

As best seen in FIG. 11A, each mounting rail 560, 564 includes an elongate body having a series of generally rectangular-shaped ridges 568 that are formed perpendicular or transverse to the long axis of the mounting rail. The ridges 568 may be uniformly spaced from one another and may be of uniform height. The ridges 568 may be separated by respective slots 572 disposed therebetween. In a common configuration of the mounting rail 560, 564, the ridges 568 have a height of approximately 3 mm, and a spacing between adjacent ridges or slots 572 of approximately 10 mm.

In FIG. 11, a flashlight 542 or light is shown resident within an accessory tool housing 546 that is fitted over and secured to the mounting rail 564 (FIG. 11A). As discussed above, the accessory tool housing 546 may include a female dovetail profile dimensioned to complement the male dovetail profile of the mounting rail 560, 564 such that the accessory tool housing 546 may be snap-fitted or pinch-fitted over the mounting rail 560, 564 and secured thereto using suitable hardware, e.g., a screw. As discussed above, FIG. 11C shows an accessory tool housing 546 that may comprise two parts of a whole that can be fitted over and tightened to the mounting rail 564 using suitable fastening hardware 576, e.g., nut and bolt. The accessory tool housing 546 includes an internal bore sized to receive the flashlight 542. The mounting rails 560, 564 may be a standard rail such as a Picatinny rail, a Weaver rail. Any type of rail, including a rail with a square or angled dovetail profile may be used.

Figure 12:
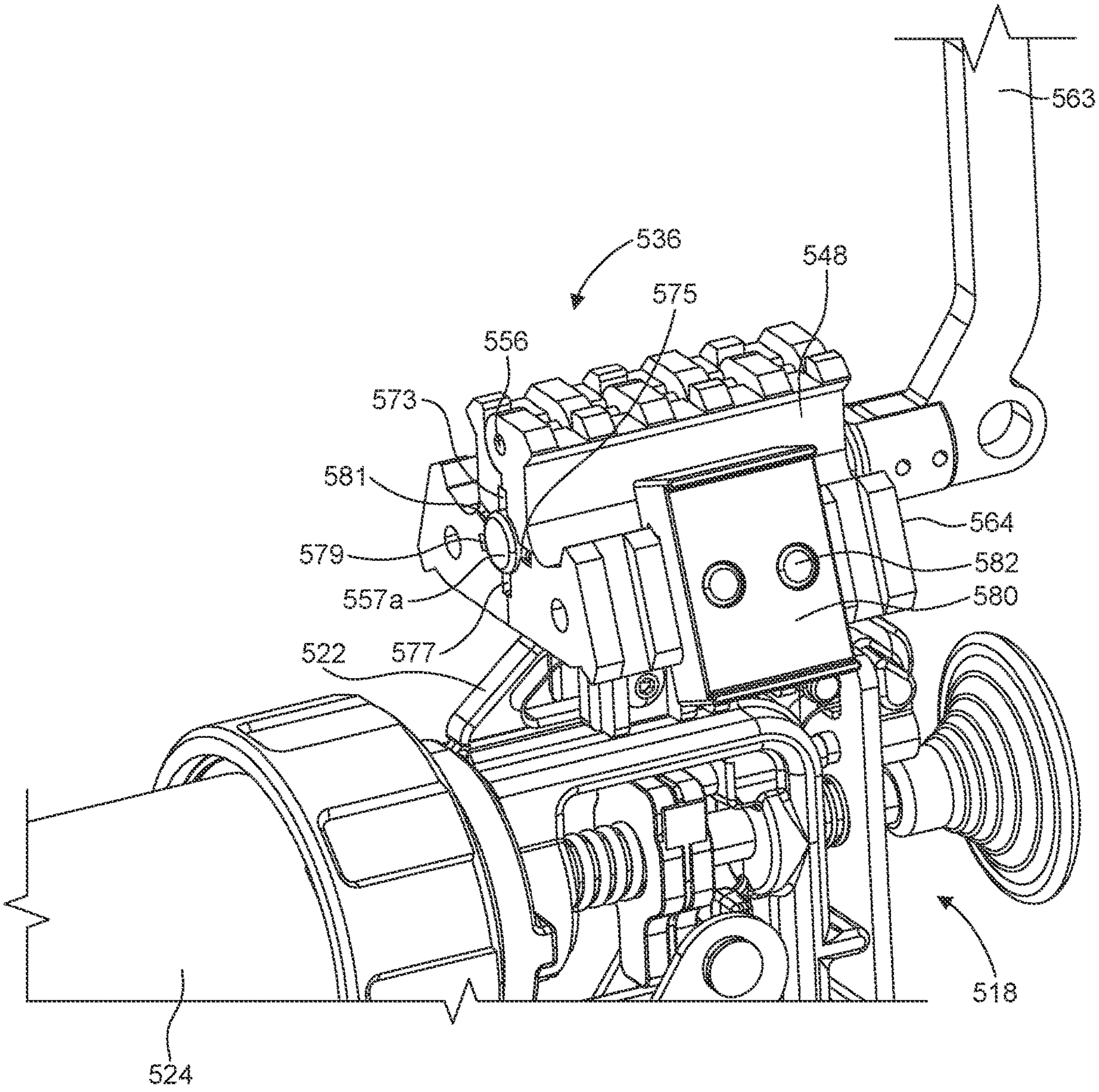
FIG. 12 is an enlarged perspective view of a portion of the dispensing device of FIG. 10 illustrating the retention structure with a retention interface mounted thereon.

As shown in FIGS. 12 and 13, the mounting rail 564 may be utilized for mounting a retention interface 580 thereon. The retention interface 580 may be dimensioned to be snap-fitted over the mounting rail 564 and secured to the rail as described above, and may include retention features including magnets, e.g., a pair of circular magnets, and upstanding shoulders located at opposite ends thereof, to enable retention of an accessory tool, e.g., a putty knife 584 having a flat blade 584*a* therein.

Referring now to FIGS. 14-19, a caulking gun hanger 563 is provided as an accessory tool to enable an operator to hang a caulking gun on fixtures such as a swing stage, a ladder, scaffolding, and other work fixtures in the work environment. The hanger 563 includes a hook portion 553 for engaging with the work fixture, and a shank portion 557 having a free end 557*a*. As best shown in FIG. 14, the hook portion 553 may include through openings, i.e., an upper through opening positioned at a free end of the hook portion 553, and a lower through opening positioned at the opposite end of the hook portion 553. The through openings may be provided to enable attachment of a wearable strap assembly 610 to a caulking gun, as discussed in detail below. The hook portion 553 and shank portion 557 may be of unitary construction or may be discrete components joined together as shown in the figures.

As best shown in FIGS. 14 and 15, the retention structure 536 is provided with an internal channel 555 arranged to receive and retain therein the shank portion 557 of the hanger 563. The internal channel 555 includes a major axis and a sidewall to define a cylindrical interior surface. As discussed in further detail below, the internal channel 555 enables rotational movement of the hanger 563 into one of several stowed or deployed orientations with respect to the caulking gun 500 to reduce or eliminate swinging of the caulking gun while hanging from the work fixture during use.

Continuing to refer to FIG. 15, the shank portion 557 extends the length of the internal channel 555 from an inlet opening 559 towards an outlet opening 561 of the retention structure 536. The shank portion 557 is biased towards a retracted position by a coil spring 565 or similar biasing member positioned thereon between a shoulder 567 carried on the shank portion 557 and a stop surface 569 carried by the internal channel 555. An index pin 571 is positioned on the free end 557*a* of the shank portion 557 and extends laterally therefrom. In response to operator actuation, the shank portion 557 is arranged to slide translationally within the internal channel 555 from the retracted position where the index pin 571 remains disposed within the internal channel 555 (as shown in FIG. 15) to an extended position where the index pin 571 extends through and outside the outlet opening 561.

As best illustrated in FIGS. 12 and 15, a plurality of registration pockets 573, 575, 577, 579, and 581 are positioned about the outlet opening 561. As shown in FIG. 12, the registration pocket 573 is located at a twelve o'clock position, the registration pocket 575 is located at a three o'clock position, the registration pocket 577 is located at a six o'clock position, the registration pocket 579 is located at an eight o'clock position, and the registration pocket 581 is located at a ten o'clock position. Each registration pocket includes a shallow bottom; and each registration pocket extends in a radial direction from the cylindrical sidewall of the internal channel 555 and is open to the outlet opening 561. Sliding the shank portion 557 to the extended position causes the index pin 571 to protrude through the outlet opening 561. The shank portion 557 may then be rotated to position the index pin 571 adjacent any one of the registration pockets 573, 575, 577, 579, and 581. Upon release of the hanger 563, the coil spring 565 returns the shank portion 557 to the retracted position causing the index pin 571 to lodge within the selected registration pocket to orient the hanger 563 with respect to the caulking gun 500 in any one of several angular orientations based on user preference.

Figure 16:
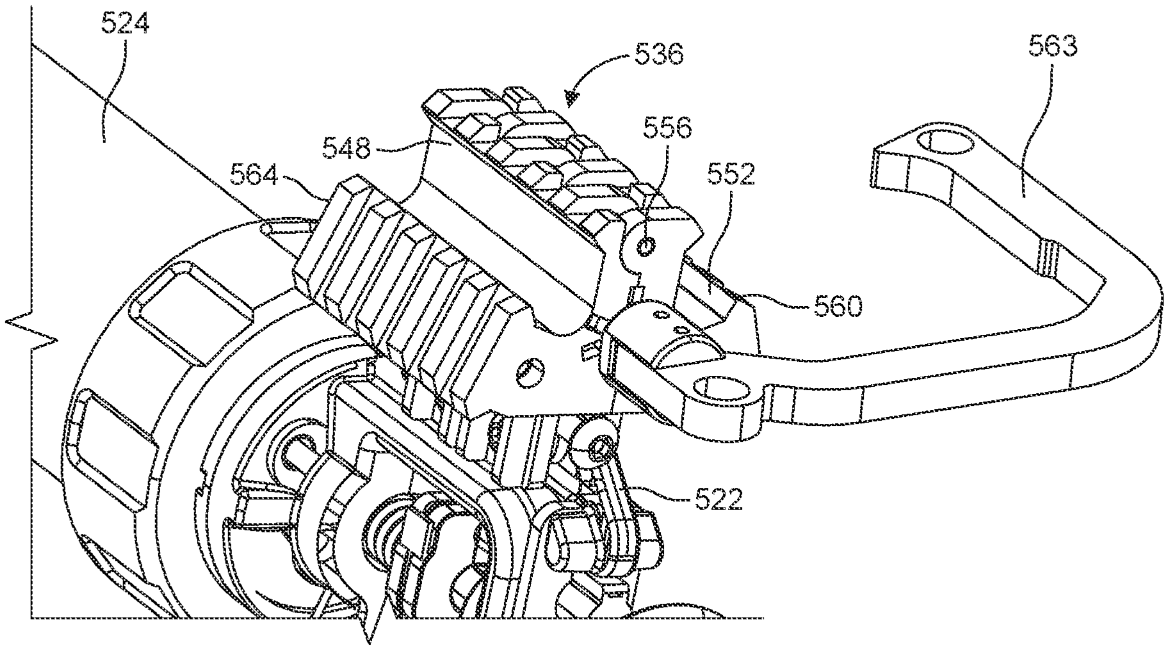
FIG. 16 is an enlarged perspective view of a portion of the dispensing device of FIG. 10 showing the caulking gun hanger retained within the retention structure at a first lateral deployed orientation.
Figure 17:
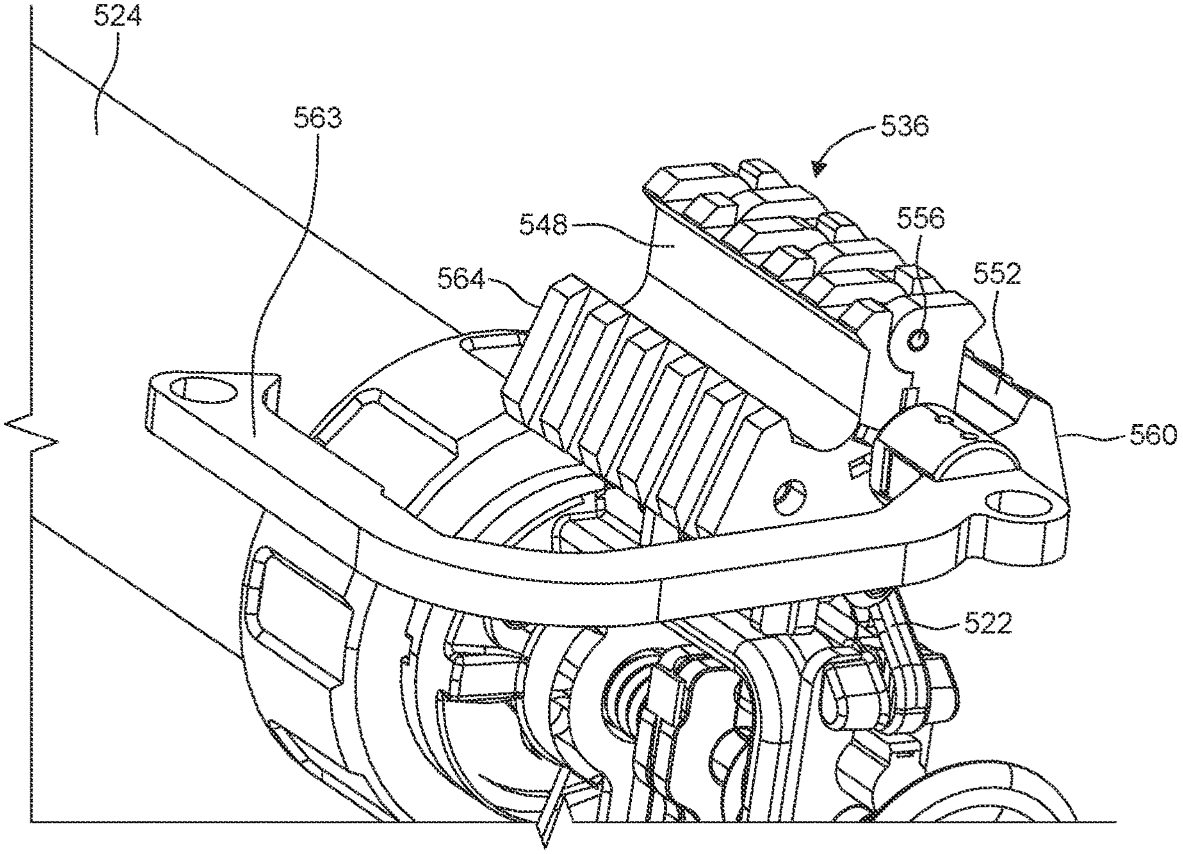
FIG. 17 is an enlarged perspective view of a portion of the dispensing device of FIG. 10 showing the caulking gun hanger retained within the retention structure at a second lateral deployed orientation.
Figure 18:
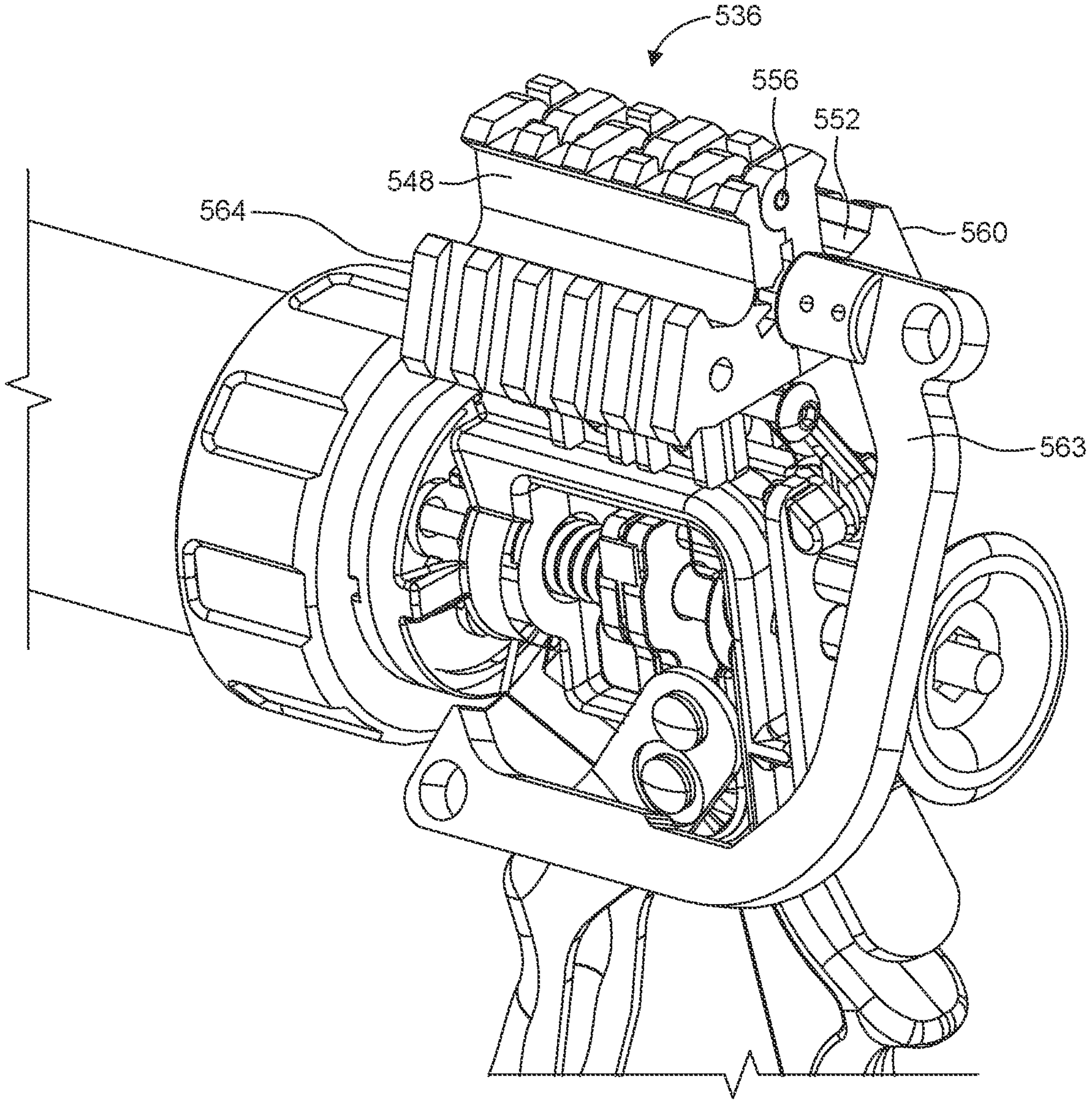
FIG. 18 is an enlarged perspective view of a portion of the dispensing device of FIG. 10 showing the caulking gun hanger retained within the retention structure at a first stowed orientation.
Figure 19:
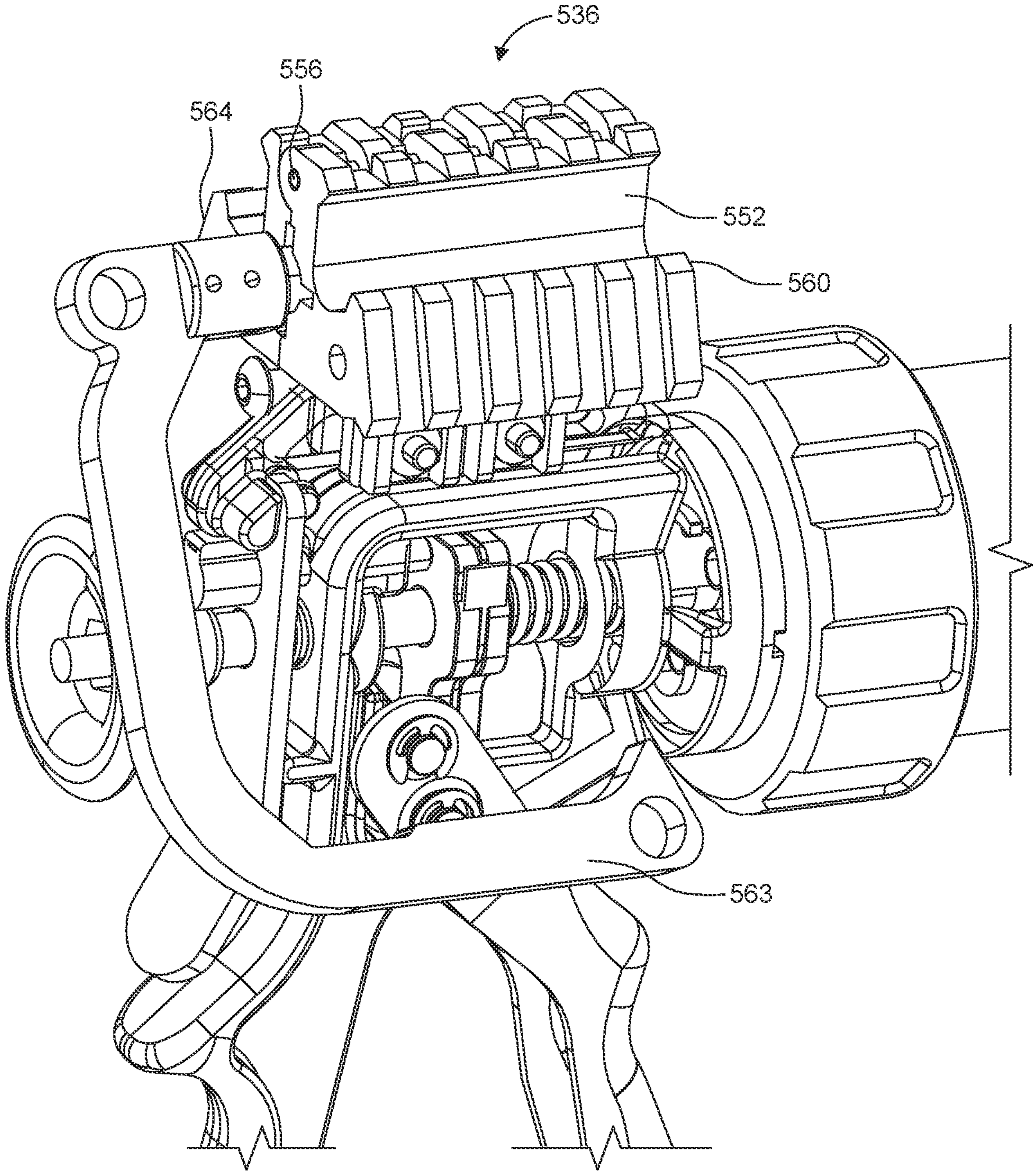
FIG. 19 is an enlarged perspective view of a portion of the dispensing device of FIG. 10 showing the caulking gun hanger mounted within the retention structure at a second stowed orientation.

For example, as shown in FIGS. 12 and 15, with the index pin 571 lodged within the registration pocket 575, the hanger 563 is oriented in an upright deployed orientation. Referring to FIGS. 12 and 16, with the index pin 571 lodged in the registration pocket 573, the hanger 563 is shown oriented in a first lateral deployed position. Referring to FIGS. 12 and 17, with the index pin 571 lodged in the registration pocket 577, the hanger 563 is shown oriented in a second lateral deployed position. Referring to FIGS. 12 and 18, with the index pin 571 lodged in the registration pocket 579, the hanger 563 is shown oriented in a first stowed position. Referring to FIGS. 12 and 19, with the index pin 571 lodged in the registration pocket 581, the hanger 563 is shown oriented in a second stowed position.

In an embodiment not shown, a spring-loaded detent mechanism may be used in substitution to enable rotational movement of the hanger 563 to one of the several stowed and deployed orientations described above. The detent mechanism can be, for example, a ball member contained within one of the housing components 548, 552 that utilizes a spring to bias the ball member to protrude partially through an opening in the housing component, e.g., a circular opening. A plurality of recessed seats for receiving and supporting the ball member may be evenly positioned along the circumference of the shoulder 567 of the shank portion 557 in alignment with the ball member. Rotation of the shank portion 557 will cause the ball member to lodge within any one of the recessed seats to provide frictional engagement to retain the hanger 563 in any one of the orientations described above.

Referring now to FIGS. 20-23, a wearable strap assembly 610 is provided as an accessory to enable an operator to carry a dispensing device, e.g., a caulking gun 600, in a hands-free manner that retains the caulking gun 600 close to the body regardless of whether the operator is right-handed or left-handed. As described above, the caulking gun 600 includes a forward section in the form of a cylindrical barrel 624 having a major axis that houses a viscous material for dispensing, and a drive assembly 618 joined to the barrel 624. The drive assembly 618 includes a trigger assembly 614 formed of a pivotally mounted trigger 616 and an associated handle grip 620. Alternatively, the forward section of the caulking gun 600 could be in the form of a carriage assembly of conventional design for housing a cartridge containing a viscous material to be dispensed. The caulking gun 600, whether operating to dispense in bulk, from cartridges, or from sausages, operates in the manners described above.

Figure 22:
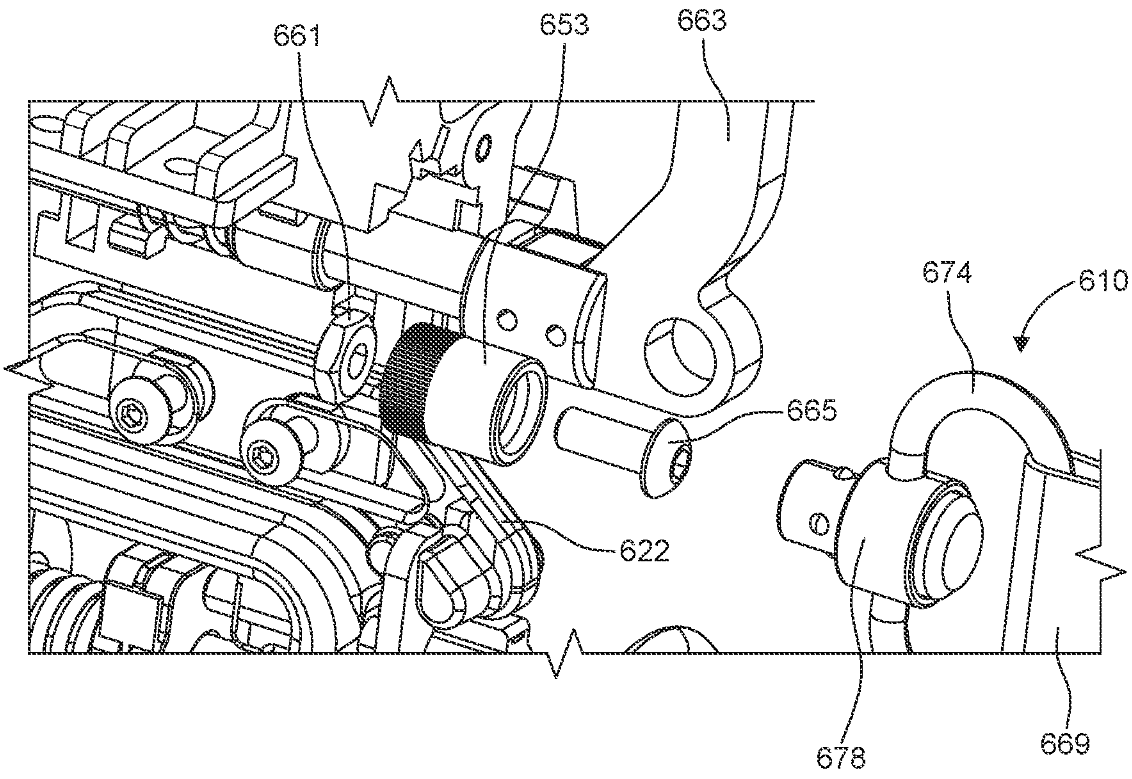
FIG. 22 is an enlarged perspective view illustrating details relating to the wearable strap assembly.
Figure 22A:
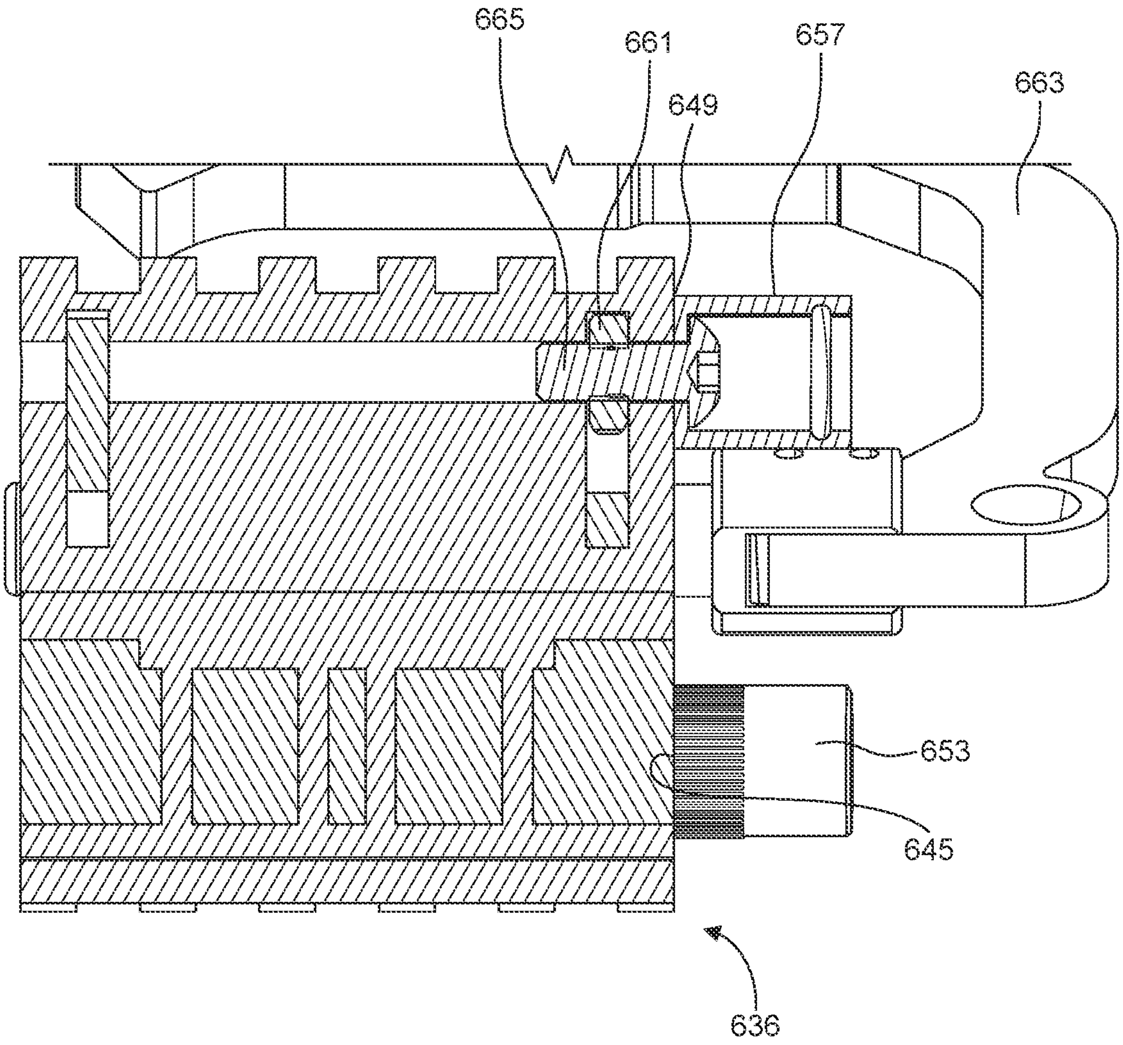
FIG. 22A is an enlarged side elevational view illustrating details relating to the wearable strap assembly; and, FIG. 23 is an enlarged end elevational view illustrating details relating to the wearable strap assembly.
Figure 23:
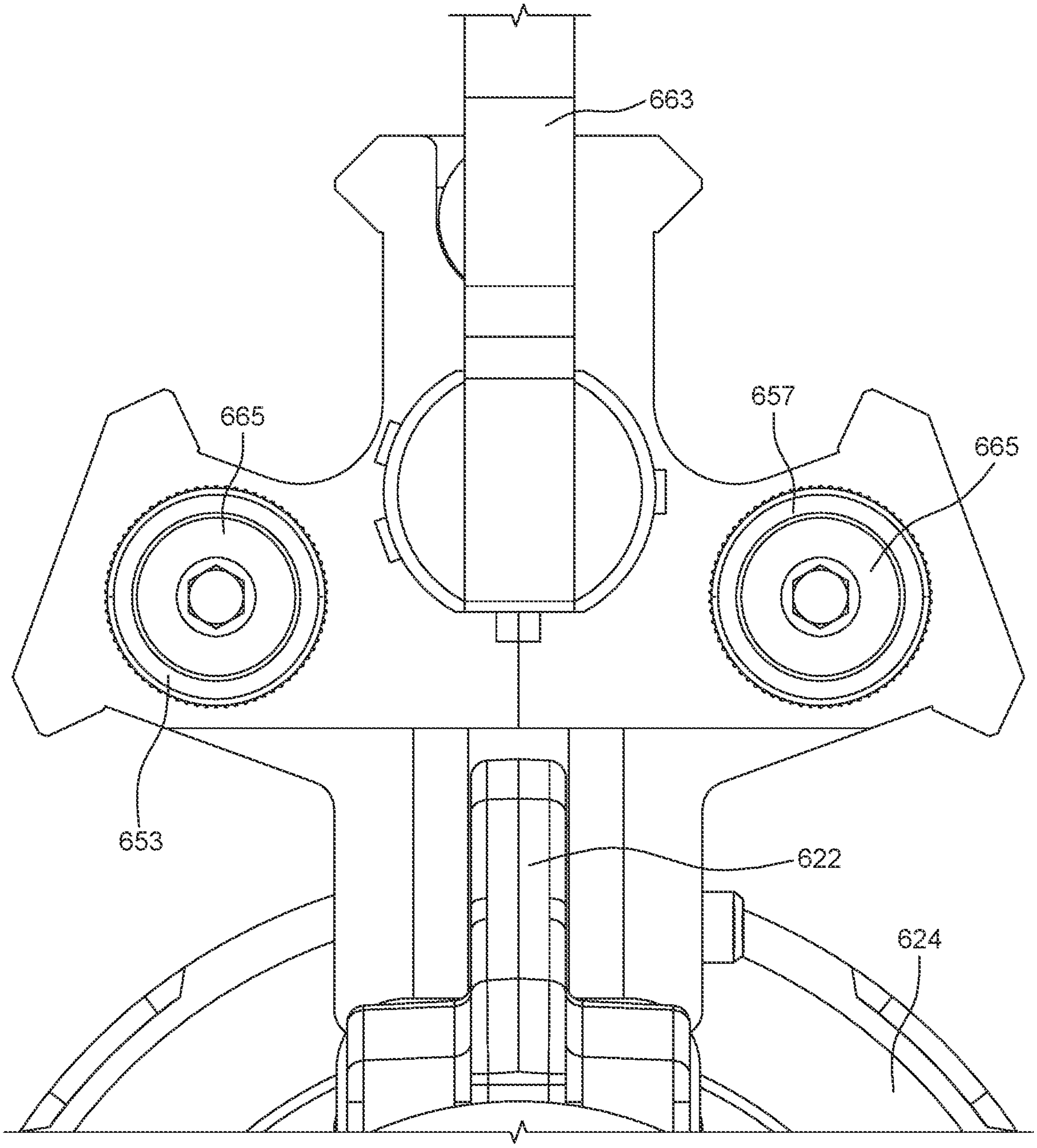

A retention structure 636 is shown clamped to a frame portion 622 of the drive assembly 618. The retention structure 636 includes the same features as described above and is clamped to the frame portion 622 in the same manner as described above. As best shown in FIG. 22A, the retention structure 636 includes a first opening 645 and a second opening 649 located at a distal end thereof, the openings provided for mounting receptors 653, 657 to the retention structure 636. In particular, the receptor 653 is shown mounted to the opening 645 and the receptor 657 is mounted to the opening 649. As best shown in FIGS. 22, 22A, and 23, the receptors 653, 657 may be mounted to their respective openings 645, 649 using any suitable hardware such as a nut 661 and bolt 665. The nut 661 may be include a threaded hole and be held captive within the retention structure 636. As best shown in FIG. 23, once mounted, the receptors 653, 657 are located at positions that are offset at opposite sides of the center axis of the internal channel 555 and serve as alternative connection points for a wearable strap assembly 610. In an alternative embodiment, instead of the receptors 653, 657 being separate components mounted to openings in the retention structure 636, the receptors could be integral with and form a part of the retention structure 636.

Figure 20:
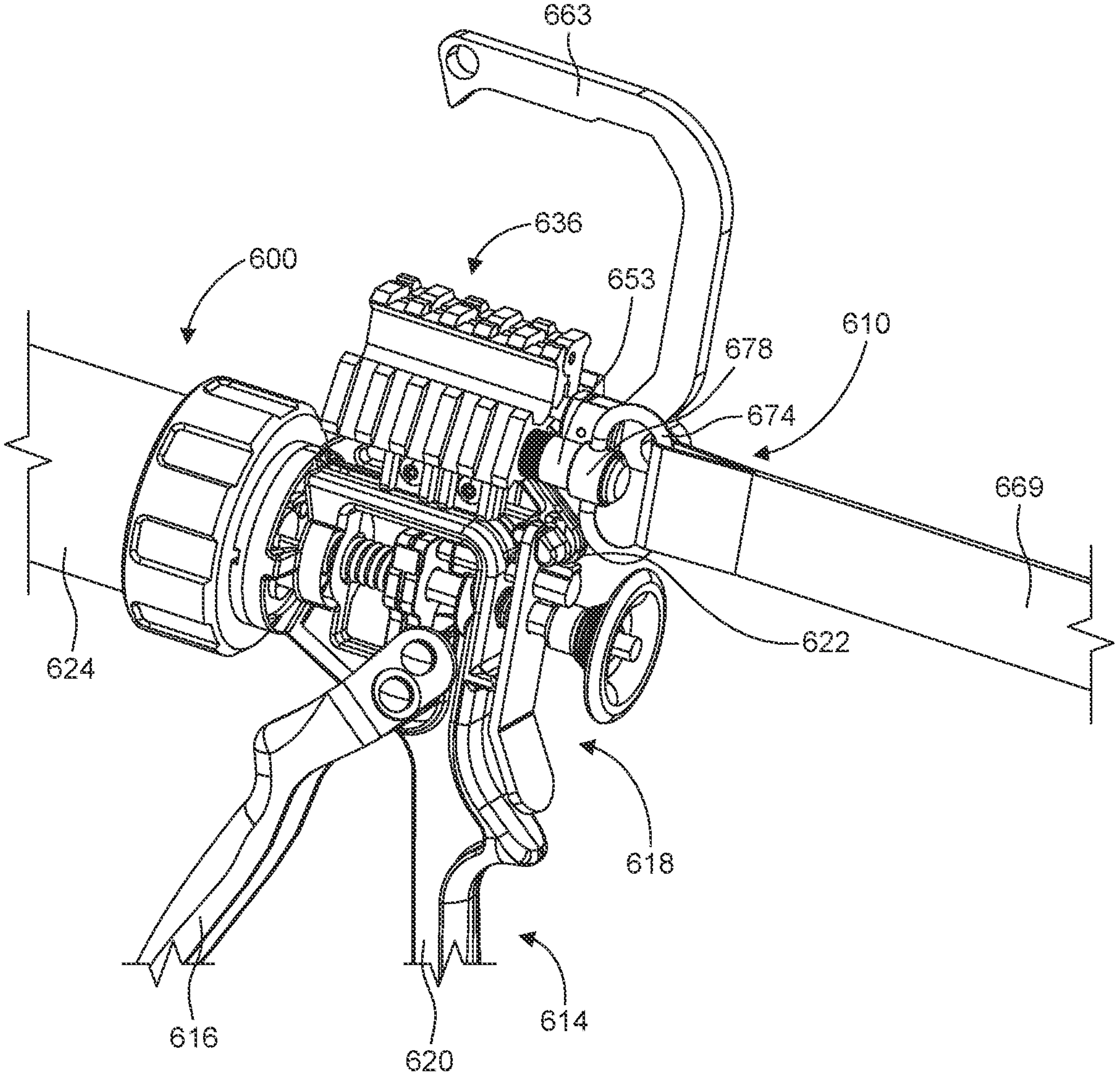
FIG. 20 is an enlarged perspective view of a portion of the dispensing device of FIG. 10 illustrating an inventive wearable strap assembly arranged for attachment to the retention structure.
Figure 21:
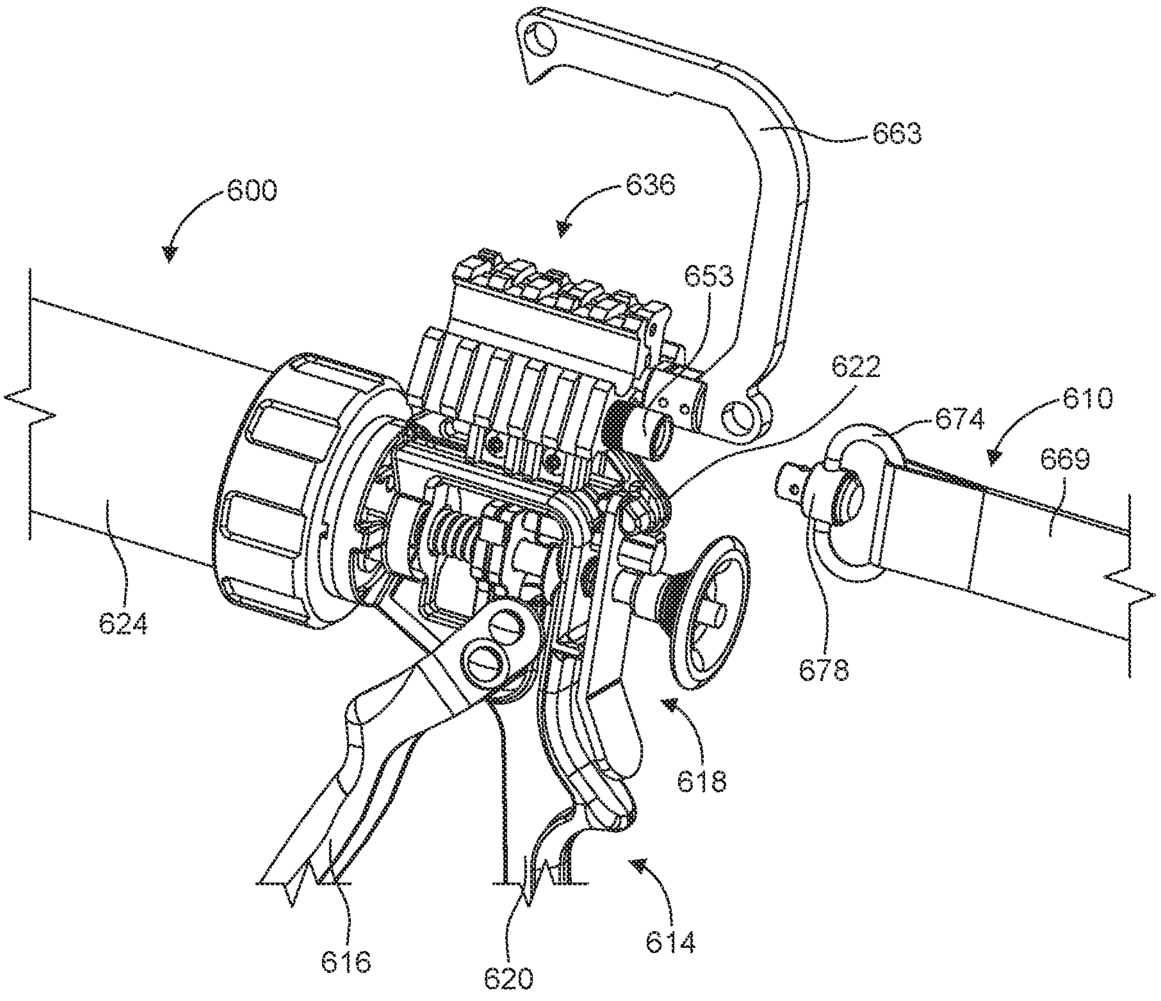
FIG. 21 is an enlarged perspective view of a portion of the dispensing device of FIG. 10 illustrating operation of the wearable strap assembly.
Figure 21A:
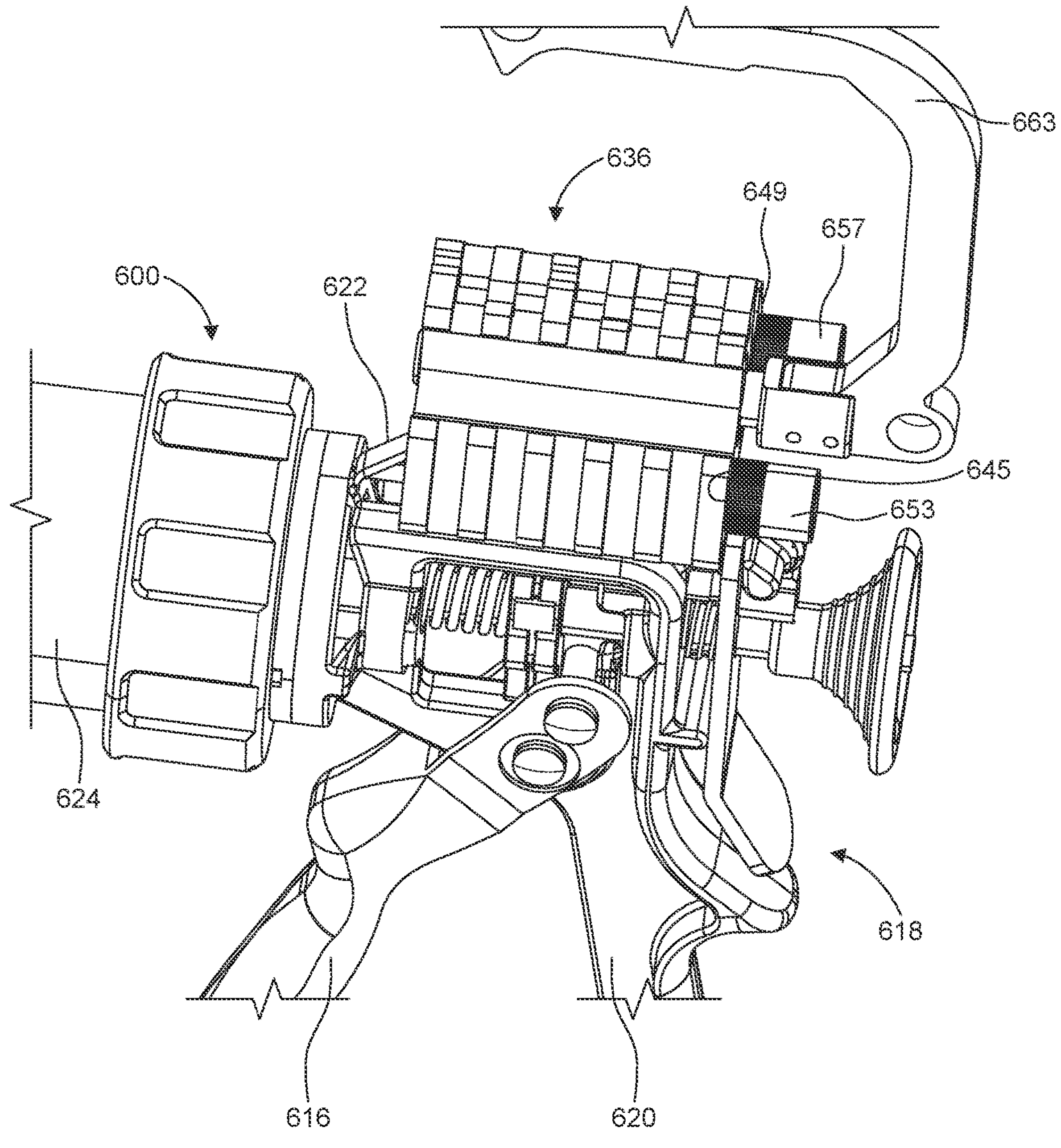
FIG. 21A is an enlarged perspective view of a portion of the dispensing device of FIG. 10 illustrating details relating to the wearable strap assembly.

As best shown in FIGS. 20-21, the wearable strap assembly 610 includes a strap 669 that may have a loop configuration to enable wearing around an operator's neck. Alternatively, the strap 669 could be arranged for wearing over an operator's shoulder. The strap 669 is shown extending through a closed oval-shaped bracket 674 to which a quick-disconnect (QD) type coupling 678 is mounted. The QD coupling 678 is arranged to couple with either of the receptors 653, 657 depending upon whether the operator is left-handed or right-handed. By choosing the appropriate receptor, the operator may carry the caulking gun 600 in a hands-free manner such that the caulking gun will remain close to the operator's body in a comfortable position during carrying.

In another embodiment, the strap assembly 610 may be utilized as a tie-off to tie off or connect a caulking gun 600 to a fixture in the work environment such as a ladder, a swing stage, scaffolding, or other work fixtures. In the event the operator drops the tool while working at a high elevation, the strap assembly 610 will prevent the tool from falling to the ground and potentially causing injury.

In yet another embodiment, the QD coupling 678 of the strap assembly 610 could be arranged for coupling to either of the upper and lower through openings of the hook portion 553 of the hanger 563 to tie off the caulking gun 600 to a work fixture or for wearing by an operator.

In yet another embodiment, the lower through opening of the hook portion 553 could be oriented co-axially with the center axis of the internal channel 555 to provide a centered connection point for the QD coupling 678 in addition to receptors 653 and 657 which are offset from the center axis.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. An assembly for adjusting a rotational position of a ladder hook mounted to a dispensing device, the dispensing device including a drive member for dispensing flowable material from a receptacle, the assembly comprising:

a. a housing body having a clamping member configured to engage with a portion of the dispensing device, the housing body having an inlet end, an outlet end, and a receiving channel extending therebetween, the receiving channel having a major axis and a sidewall to define an interior surface;

b. at least one registration pocket located along the interior surface and extending in a radial direction from the major axis;

c. the ladder hook including a shank portion configured to move slidably and rotatably within the receiving channel, and a hooked portion configured for releasable attachment to a work structure; and, d. an index pin positioned on the shank portion, the index pin arranged for insertion into the at least one registration pocket and removal therefrom.

2. The assembly of claim 1, further comprising a spring-loaded shoulder disposed on the shank portion, the spring-loaded shoulder configured to limit sliding movement of the shank portion towards the outlet end to an extended position.

3. The assembly of claim 2, wherein the spring-loaded shoulder is an annular shoulder.

4. The assembly of claim 2, wherein when the shank portion is in the extended position, the index pin protrudes through the outlet end of the housing body.

5. The assembly of claim 1, wherein the at least one registration pocket is positioned at the outlet end of the housing body.

6. The assembly of claim 1, wherein the at least one registration pocket comprises a plurality of registration pockets, each extending in a different direction from the major axis.

7. The assembly of claim 6, wherein the shank portion is arranged to be moved slidably and rotatably within the receiving channel for insertion of the index pin into any of the plurality of registration pockets and removal therefrom.

8. The assembly of claim 6, wherein the receiving channel includes a circumference and wherein the plurality of registration pockets are positioned about the circumference.

9. The assembly of claim 8, wherein the plurality of registration pockets includes a first registration pocket positioned at a 3 o'clock position, and second registration pocket positioned at a 6 o'clock position.

10. The assembly of claim 1, wherein the index pin projects in a radial direction from the major axis.

11. The assembly of claim 1, wherein the shank portion and the hooked portion are of unitary construction.

12. The assembly of claim 1, wherein the shank portion and the hooked portion are discrete components joined together.

13. The assembly of claim 1, wherein the index pin is positioned on a free end of the shank portion.

* * * * *